United States Patent
Hotta et al.

(10) Patent No.: US 7,761,264 B2
(45) Date of Patent: Jul. 20, 2010

(54) EVALUATION IMPLEMENT OF ENVIRONMENTAL LOAD AND EVALUATION PROGRAM OF ENVIRONMENTAL LOAD

(75) Inventors: Miyako Hotta, Hitachi (JP); Tomotoshi Ishida, Hitachinaka (JP); Yoshiaki Ichikawa, Tokai (JP)

(73) Assignee: Hitachi, Ltd., Tokyo (JP)

( * ) Notice: Subject to any disclaimer, the term of this patent is extended or adjusted under 35 U.S.C. 154(b) by 1239 days.

(21) Appl. No.: 11/316,804

(22) Filed: Dec. 27, 2005

(65) Prior Publication Data

US 2006/0190096 A1    Aug. 24, 2006

(30) Foreign Application Priority Data

Dec. 28, 2004   (JP) .............................. 2004-378580

(51) Int. Cl.
  *G06F 17/50* (2006.01)
(52) U.S. Cl. .............................................. 703/1; 703/6
(58) Field of Classification Search .................. 703/1, 703/6; 702/186
  See application file for complete search history.

(56) References Cited

U.S. PATENT DOCUMENTS

| | | | | |
|---|---|---|---|---|
| 5,852,560 A * | 12/1998 | Takeyama et al. | ............. | 700/97 |
| 6,811,344 B1 * | 11/2004 | Kobayashi et al. | ............. | 403/2 |
| 7,299,202 B2 * | 11/2007 | Swanson | ...................... | 705/27 |
| 2002/0002408 A1 * | 1/2002 | Kobayashi et al. | ............. | 700/29 |
| 2002/0099587 A1 * | 7/2002 | Kakihana et al. | ............... | 705/7 |
| 2002/0143473 A1 * | 10/2002 | Kobayashi et al. | ............. | 702/23 |
| 2003/0210241 A1 * | 11/2003 | Minami et al. | .............. | 345/418 |
| 2004/0054516 A1 * | 3/2004 | Oyasato et al. | ............... | 703/22 |
| 2005/0154704 A1 * | 7/2005 | Yuda et al. | ...................... | 707/1 |

* cited by examiner

*Primary Examiner*—Dwin M Craig
(74) *Attorney, Agent, or Firm*—Mattingly & Malur, P.C.

(57) ABSTRACT

An evaluation implementation of an environmental load includes a design plan information comparing part for extracting a difference in parts structure, material, or process between a plurality of product design plans stored in a design plan information storing part, an environmental load evaluation value comparing part for calculating a difference in environmental load evaluation value between a plurality of product design plans, from which differences in parts structure, material, or process have been extracted by the design plan information comparing means part, using the environmental load evaluation value comparing part, and a display part for displaying the difference in parts structure, material, or process between the plurality of product design plans calculated by the design plan information comparing part, and the differences in the environmental load evaluation values calculated by the design plan comparing part using the environmental load evaluation value comparing part.

14 Claims, 29 Drawing Sheets

FIG.6

| PROCESS | ENVIRONMENTAL LOAD ITEM | VALUE | UNIT |
|---|---|---|---|
| PP MANUFACTURING | $CO_2$ | 500.0 | g/kg |
| PP INJECTION | $CO_2$ | 600.0 | g/kg |
| TRANSPORTED BY 5-t TRUCK | $CO_2$ | 1,000.0 | g/kg |
| STEEL PRESS | $CO_2$ | 3,000.0 | g/kg |
| STEEL RECYCLE | $CO_2$ | 1,500.0 | g/kg |
| PP SHREDDER DISPOSAL | $CO_2$ | 2,000.0 | g/kg |
| PS INJECTION | $CO_2$ | 600.0 | g/kg |
| USE OF PRODUCT A | $CO_2$ | 500.0 | g/kg |

FIG.9

| COMPARED ELEMENT | COMPARED ITEM |
|---|---|
| | PARTS CODE — 91 |
| PART | PARTS NAME — 92 |
| | MASS — 93 |
| | QUANTITY — 94 |

FIG.10

| DESIGN PLAN 1001 | PARTS CODE 1002 | COMPARED DESIGN PLAN 1003 | CORRE-SPONDING PARTS CODE 1004 | DIFFERENCE | | | |
|---|---|---|---|---|---|---|---|
| | | | | PARTS CODE 1005 | PARTS NAME 1006 | MASS 1007 | QUANTITY 1008 — 1009 |
| DESIGN PLAN A | PART 12 | DESIGN PLAN B | NULL | | | | |
| DESIGN PLAN A | PART 2 | DESIGN PLAN B | PART 2' | × | ○ | × | ○ — 1010 |
| DESIGN PLAN A | PART 12 | DESIGN PLAN B | PART 12 | ○ | ○ | ○ | ○ — 1011 |

FIG.12

| COMPARED ELEMENT | COMPARED ITEM |
|---|---|
| MATERIAL | MATERIAL CODE ~121 |
|  | MATERIAL NAME ~122 |
|  | MASS ~123 |

FIG.13

| DESIGN PLAN | PARTS CODE | MATERIAL CODE | COMPARED DESIGN PLAN | CORRE-SPONDING PARTS CODE | CORRE-SPONDING MATERIAL CODE | DIFFERENCE | | |
|---|---|---|---|---|---|---|---|---|
| | | | | | | MATERIAL CODE | MATERIAL NAME | MASS |
| DESIGN PLAN A | PARTS 12 | MATERIAL 2 | DESIGN PLAN B | PARTS 12 | NULL | ○ | | |
| DESIGN PLAN A | PARTS 11 | MATERIAL 1 | DESIGN PLAN B | PARTS 11 | MATERIAL 1 | ○ | ○ | × |

| COMPARED ELEMENT | COMPARED ITEM |
|---|---|
| PROCESS | PROCESS CODE ~1501 |
|  | PROCESS NAME ~1502 |
|  | PROCESS ATTRIBUTE VALUE ~1503 |

FIG.16

| DESIGN PLAN | PARTS CODE | MATERIAL CODE | PROCESS CODE | COMPARED DESIGN PLAN | CORRE-SPONDING PARTS CODE | CORRE-SPONDING MATERIAL CODE | CORRE-SPONDING PROCESS CODE | DIFFERENCE PROCESS CODE | DIFFERENCE PROCESS NAME | MASS |
|---|---|---|---|---|---|---|---|---|---|---|
| DESIGN PLAN A | PARTS12 | MATERIAL2 | PROCESS4 | DESIGN PLAN B | PARTS12 | NULL |  |  |  |  |
| DESIGN PLAN A | PARTS11 | MATERIAL1 | PROCESS1 | DESIGN PLAN B | PARTS11 | MATERIAL1 |  |  |  |  |
| DESIGN PLAN A | PARTS12 |  | PROCESS5 | DESIGN PLAN B | PARTS12 |  |  |  |  |  |
| DESIGN PLAN A | PARTS11 |  | PROCESS3 | DESIGN PLAN B | PARTS11 |  | PROCESS3 | ○ | ○ | ○ |
| DESIGN PLAN A | PARTS2 | MATERIAL3 | PROCESS6 | DESIGN PLAN B | PARTS2 | MATERIAL3 | PROCESS6 | ○ | ○ | × |

FIG.20

| DESIGN PLAN 2001 | PARTS CODE 2002 | MATERIAL CODE 2003 | PROCESS CODE 2004 | COMPARED DESIGN PLAN 2005 | ENVIRON-MENTAL LOAD 2006 | PRESENCE/ABSENCE OF OBJECT TO BE COMPARED 2007 | DIFFERENCE 2008 | RATIO 2009 |
|---|---|---|---|---|---|---|---|---|
| DESIGN PLAN A | PARTS 2 | MATERIAL 3 | PROCESS 6 | DESIGN PLAN B | $CO_2$ | ○ | 1090 | 0.19224 |
| DESIGN PLAN A | PARTS 2 | MATERIAL 3 | PROCESS 6 | DESIGN PLAN B | SOx | ○ | 2190 | 0.328336 |
| DESIGN PLAN A | PARTS 11 | MATERIAL 1 | PROCESS 1 | DESIGN PLAN B | $CO_2$ | × | 1800 | 1.00 |
| DESIGN PLAN A | PARTS 11 | MATERIAL 1 | PROCESS 1 | DESIGN PLAN B | SOx | × | 5900 | 1.00 |
| DESIGN PLAN A | PARTS 1 | | PROCESS 1 | DESIGN PLAN B | $CO_2$ | ○ | -750 | -0.06 |
| DESIGN PLAN A | PARTS 1 | | PROCESS 1 | DESIGN PLAN B | SOx | ○ | -980 | -0.12 |

| DESIGN PLAN 2201 | PART 2202 | MATERIAL 2203 | PROCESS 2204 | ENVIRONMENTAL LOAD 2205 | ENVIRONMENTAL LOAD VALUE 2206 |
|---|---|---|---|---|---|
| DESIGN PLAN A | PARTS 11 | MATERIAL 1 | PROCESS 1 | $CO_2$ | 1800 |
| DESIGN PLAN A | PARTS 11 | MATERIAL 1 | PROCESS 1 | $SOx$ | 5900 |
| DESIGN PLAN A | PARTS 2 | MATERIAL 3 | PROCESS 6 | $CO_2$ | 5670 |
| DESIGN PLAN A | PARTS 2 | MATERIAL 3 | PROCESS 6 | $SOx$ | 6670 |
| DESIGN PLAN B | PARTS 2 | MATERIAL 3 | PROCESS 6 | $CO_2$ | 4580 |
| DESIGN PLAN B | PARTS 2 | MATERIAL 3 | PROCESS 6 | $SOx$ | 4480 |

2207, 2208, 2209, 2210, 2211, 2212

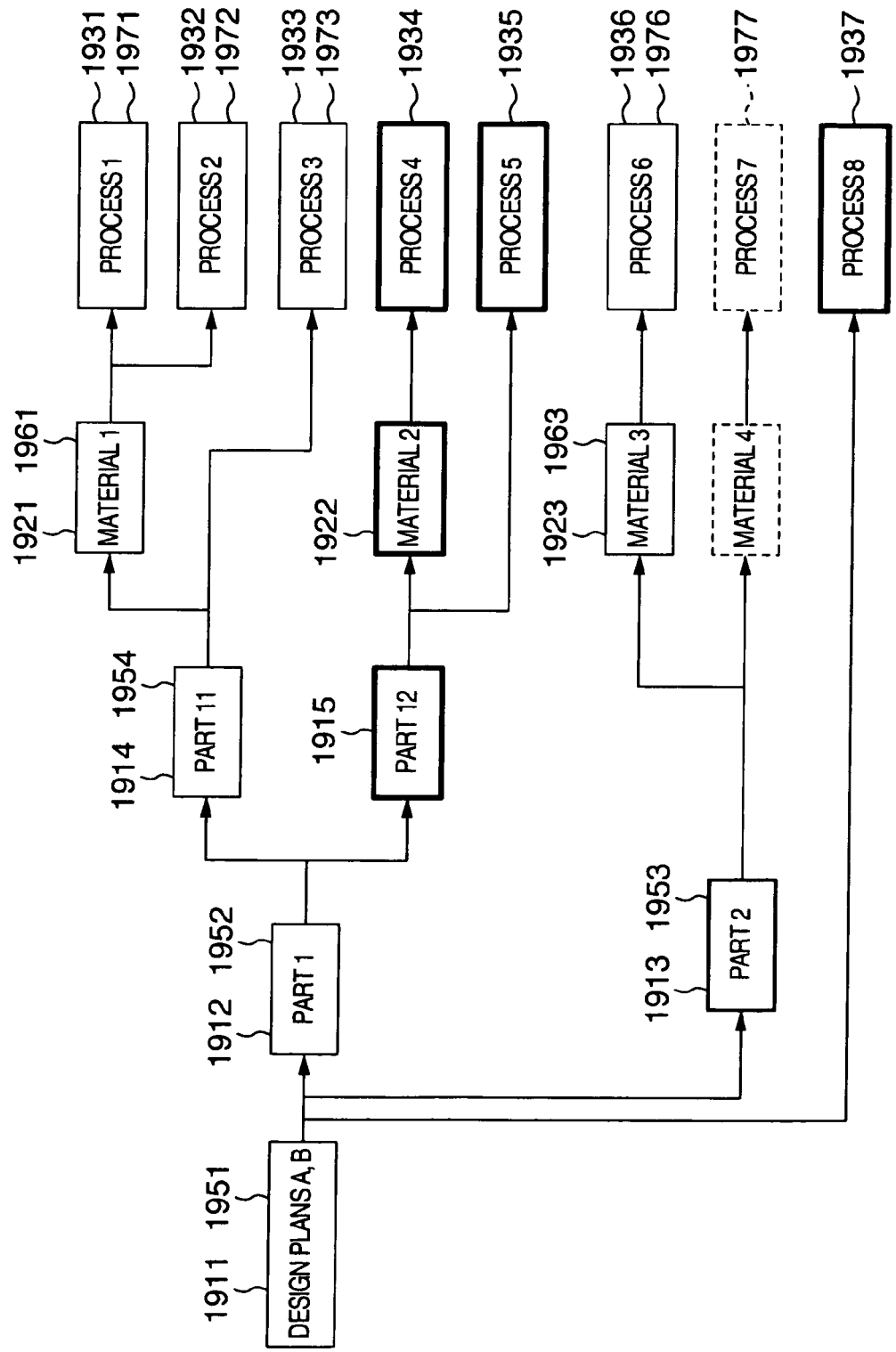

FIG.26

| PRODUCT CONFIGURATION 2601 | | | 2602 | | DESIGN PLAN A | | | | | | DESIGN PLAN B | | | | | |
|---|---|---|---|---|---|---|---|---|---|---|---|---|---|---|---|---|
| | | | PRESENCE / ABSENCE OF CONFIGURATION | DESIGN PLAN ENVIRONMENTAL LOAD | $CO_2$ | | | SOx | | | $CO_2$ | | | SOx | | |
| | MATERIAL | PROCESS | DESIGN PLAN A | DESIGN PLAN B | STAGE 1 | STAGE 2 | STAGE 3 | STAGE 1 | STAGE 2 | STAGE 3 | STAGE 1 | STAGE 2 | STAGE 3 | STAGE 1 | STAGE 2 | STAGE 3 |
| PRODUCT A | | PRODUCT ASSEMBLY | 1 | 1 | | 0 | 0 | | 0 | 0 | | 0 | 0 | | 0 | 0 |
| | | TRANSPORTED BY 10-t TRUCK | 1 | 1 | | 0 | 0 | | 0 | 0 | | 0 | 0 | | 0 | 0 |
| - PART 1 | | PART ASSEMBLY | 1 | 1 | | 0 | 39102 | | 0 | 0 | | 0 | 39102 | | 0 | 0 |
| | CAST IRON | CASTING | 1 | 1 | | 0 | 39102 | | 0 | 0 | | 0 | 39102 | | 0 | 0 |
| | | TRANSPORTED BY 10-t TRUCK | 1 | 1 | 63690 | 600000 | 0 | 345600 | 0 | 0 | 63690 | 400000 | 0 | 345600 | 0 | 0 |
| | | TRANSPORTED BY 20-t TRUCK | 1 | 1 | 56800 | 600000 | 0 | 300000 | 0 | 0 | 56800 | 0 | 0 | 300000 | 0 | 0 |
| -- PART 11 | COOLED STEEL PLATE | COOLED STEEL PLATE MANUFACTURING | | 1 | 0 | 0 | 0 | 0 | 0 | 0 | 0 | 400000 | 0 | 0 | 0 | 0 |
| | | | 1 | 1 | 6890 | 0 | 0 | 45600 | 0 | 0 | 6890 | 0 | 0 | 45600 | 0 | 0 |
| | ALUMINUM | ALUMINUM MANUFACTURING | 1 | 1 | 5670 | 0 | 0 | 55432 | 0 | 0 | 5670 | 0 | 0 | 55432 | 0 | 0 |

| PRODUCT CONFIGURATION | PRESENCE / ABSENCE OF CONFIGURATION | | DESIGN PLAN | DESIGN PLAN A | | | DESIGN PLAN B | | |
|---|---|---|---|---|---|---|---|---|---|
| | DESIGN PLAN A | DESIGN PLAN B | ENVIRONMENTAL LOAD | $CO_2$ | DIFFERENCE | SOx | DIFFERENCE | $CO_2$ | DIFFERENCE | SOx | DIFFERENCE |
| PRODUCT A | 1 | 1 | | 5198690 | | 0 | | 4998690 | | 0 | |
| - PART 1 | 1 | 1 | | 702792 | 200000 (0.30) | 0 | | 502792 | -200000 (-0.30) | 0 | |
| --- PART 1 | | | | RED 663690 | | 808280 | | BLUE 463690 | | 809290 | |

FIG.28

| PRODUCT CONFIGURATION | | MATERIAL | PROCESS | PRESENCE / ABSENCE OF CONFIGURATION | | DESIGN PLAN A | | | | | DESIGN PLAN B | | | | |
|---|---|---|---|---|---|---|---|---|---|---|---|---|---|---|---|
| | | | | DESIGN PLAN A | DESIGN PLAN B | $CO_2$ | | | | $CO_2$ TOTAL | $CO_2$ | | | | $CO_2$ TOTAL |
| | | | | | | MATERIAL PROCESSING PART MACHINING | MATERIAL TRANSPORTATION | PRODUCT ASSEMBLY | PRODUCT TRANSPORTATION | | MATERIAL PROCESSING PART MACHINING | MATERIAL TRANSPORTATION | PRODUCT ASSEMBLY | PRODUCT TRANSPORTATION | |
| PRODUCT A | | | PRODUCT ASSEMBLY | | | 63690 | 0 3139000 1396000 | | | 5198690 | 63690 | 0 3139000 1396000 | | | 4998690 |
| | | | TRANSPORTED BY 10-1 TRUCK | | | 0 | 3139000 | 0 | | 3139000 | 0 | 3139000 | 0 | | 3139000 |
| - PART 1 | | | PART ASSEMBLY | | | 0 | 0 1396000 1396000 | | | | 0 | 0 1396000 1396000 | | | |
| | | CAST IRON | | | | 63690 | 600000 | 39102 | 0 | 702792 | 63690 | 400000 | 39102 | 0 | 502792 |
| | | | CASTING | | | 0 | 0 | 39102 | 0 | 39102 | 0 | 0 | 39102 | 0 | 39102 |
| | | | TRANSPORTED BY 10-1 TRUCK | 1 | | 63690 | 600000 | 0 | 0 | 663690 | 63690 | 400000 | 0 | 0 | 463690 |
| | | | TRANSPORTED BY 20-1 TRUCK | | 1 | 56800 | 0 | 0 | 0 | 56800 | 56800 | 0 | 0 | 0 | 56800 |
| - PART 11 | | COOLED STEEL PLATE | | | | 0 | 600000 | 0 | 0 | 600000 | 0 | 400000 | 0 | 0 | 400000 |
| | | | COOLED STEEL PLATE MANUFACTURING | | | 6890 | 0 | 0 | 0 | 6890 | 6890 | 0 | 0 | 0 | 6890 |
| | | ALUMINUM | ALUMINUM MANUFACTURING | | | 5670 | 0 | 0 | 0 | 5670 | 5670 | 0 | 0 | 0 | 5670 |

EVALUATION IMPLEMENT OF ENVIRONMENTAL LOAD AND EVALUATION PROGRAM OF ENVIRONMENTAL LOAD

BACKGROUND OF THE INVENTION

The present invention relates to the evaluation of an environmental load over a life cycle of a product, or to an evaluation implementation of the environmental load and an evaluation program of the environmental load.

For considering a product design, it is important to design and develop products which impose less of a load on the environment over their life cycle in addition to the performance and cost of these products. Also, for considering the Earth's environment, it is necessary to aggressively demonstrate the current state of the amount of environmental load caused by products provided to society by the manufacturing industry, their efforts for reduction of environmental load, and the like, as a role which should be played by the manufacturing industry.

LCA (Life Cycle Assessment) is an approach for evaluating an environmental load through the life cycle of a product. The "Apparatus for evaluating an environmental load of a product, a method of evaluating an environmental load, and a recording medium storing an environmental load evaluation program" described in JP-A-10-57936 models the life cycle of a product with respect to the environmental loads caused in manufacturing, using, disposal, and recycle stages of a product to facilitate a calculation of an environmental load amount for a product and to output a comparison of environmental load amounts among a plurality of types of products.

In JP-A-10-57936, since no evaluation is made with respect to units of parts which make up a product, materials, or processes, the environmental load cannot be known in units of parts, materials and processes of the product, though the environmental load amount can be calculated and displayed in units of products. For this reason, JP-A-10-57936 fails to extract a difference in the environmental load resulting from the difference in structure among a plurality of types of products.

Also, there is an environmental report, or the like, as means for demonstrating involvement of an enterprise in the environment, but information described in the environmental report about the environmental load has been in most cases partial information such as the result of an environmental load evaluation relating to a representative product. For more clearly demonstrating the involvement of an enterprise in the environment, it is contemplated to produce more effects by presenting environmental load amounts of all manufactured products, and their trends of reduction.

In recent years, mainstream moves, originated from Europe, are afoot to measure and evaluate superiority or inferiority of the involvement in the environment and human right problems among enterprises as CSR (Corporate Social Responsibility). A transition is now under way into an era in which efforts to match the policy of involvement in the environment with the global standard and to reduce the environmental load lead to a higher added value of enterprises and products developed thereby, other than the pursuit of profit.

SUMMARY OF THE INVENTION

It is therefore a first object of the present invention to provide an evaluation implementation of an environmental load which is capable of evaluating and extracting differences in values of environmental load indexes resulting from differences in parts structure, material, and process to support an environment-friendly design.

It is a second object of the present invention to provide an evaluation implementation of an environmental load which is capable of accumulating results of environmental load evaluations on products, and creating statistical information which facilitates the demonstration of efforts made by an overall enterprise for reducing the environmental load, such as a tendency of a reduction by year in environmental load due to all products of the enterprise, and the like.

It is a third object of the present invention to provide an evaluation implementation of an environmental load which is capable of comparing an environmental load amount of a product with a target level or an industrial level for use in measures for efforts of reducing the environmental load.

One feature of the present invention is that an evaluation implementation of environmental load is designed to comprise design plan information storing means for storing information on parts structures, materials, and processes of a plurality of product design plans; environmental load evaluation value calculating means for calculating an environmental load evaluation value for a product design plan using the parts structure, material, and process of the product design plan stored in the design plan information storing means; design plan information comparing means for extracting differences in parts structure, material, or process of a plurality of product design plans stored in the design plan information storing means; environmental load evaluation value comparing means for calculating a difference in environmental load evaluation value between a plurality of product design plans, from which differences in parts structure, material, or process have been extracted by the design plan information comparing means, using environmental load evaluation value calculating means, and display means for displaying the difference in parts structure, material, or process between the plurality of product design plans calculated by the design plan information comparing means, and the difference in environmental load evaluation value calculated by the design plan comparing means using the environmental load value calculating means.

Also, another feature of the present invention is that an evaluation implementation of environmental load is designed to comprise design plan information storing means for storing information on a parts structure, a material, and a process of a product design plan; design plan information storing means for storing information on a parts structure, a material, and a process of a design plan, design plan information changing means for changing the information on the parts structure, material, or process of the product design plan; environmental load value calculating means for calculating an environmental load value for a design plan stored in the design plan information storing means, and an environmental load value for the design plan after it has been changed by the design plan information changing means; environmental load evaluation value comparing means for calculating a difference between the environmental load evaluation value calculated by the environmental load evaluation value calculating means and stored in the design plan information storing means and an environmental load evaluation value for calculating the environmental load value for the design plan after it has been changed by the design plan information changing means; and display means for displaying the information on the parts structure, material, or process changed by the design plan information changing means, and the difference in the environmental load value calculated by the environmental load evaluation value comparing means.

Also, another feature of the present invention is that a computer is caused by a program to function as design plan information storing means for storing information on parts structures, materials, and processes of a plurality of product design plans; environmental load evaluation value calculating means for calculating an environmental load evaluation value for a product design plan using the parts structure, material, and process of the product design plan stored in the design plan information storing means; design plan information comparing means for extracting differences in parts structure, material, or process of a plurality of product design plans stored in the design plan information storing means; environmental load evaluation value comparing means for calculating a difference in environmental load evaluation value between a plurality of product design plans, from which differences in parts structure, material, or process have been extracted by the design plan information comparing means, using environmental load evaluation value calculating means, and display means for displaying the difference in parts structure, material, or process between the plurality of product design plans calculated by the design plan information comparing means, and the difference in environmental load evaluation value calculated by the design plan comparing means using the environmental load value calculating means.

According to the present invention, it is possible to quantitatively know to which degree a change in parts structure, material, or process affects the environmental load to carry out a design correctly in consideration of the environmental load.

BRIEF DESCRIPTION OF THE DRAWINGS

FIG. 6 is a diagram for describing an example of original unit data by environmental load item;

FIG. 9 is a diagram for describing attributes of parts to be compared;

FIG. 10 is a diagram for describing exemplary items stored in a parts structure difference storage unit;

FIG. 12 is a diagram for describing exemplary items to be compared of attributes of a material;

FIG. 13 is a diagram for describing exemplary items stored in a material difference storage unit;

FIG. 15 is a diagram for describing exemplary items to be compared of attributes of a process;

FIG. 16 is a diagram for describing exemplary items stored in a process difference storage unit;

FIG. 20 is a diagram for describing exemplary data items stored in a comparison result storage unit;

FIG. 22 is a diagram for describing exemplary contents of items stored in an environmental load evaluation result storage unit;

FIG. 25 is a diagram for describing a parts tree which is created in the examples of the design plan A and design plan B in FIG. 19;

FIG. 26 is a diagram for describing an exemplary display on the display instruction unit;

FIG. 27 is a first diagram for describing an exemplary comparison display;

FIG. 28 is a second diagram for describing the exemplary comparison display;

DETAILED DESCRIPTION OF THE EMBODIMENTS

Embodiments of the present invention will be described below.

Embodiment 1

Figure 1:
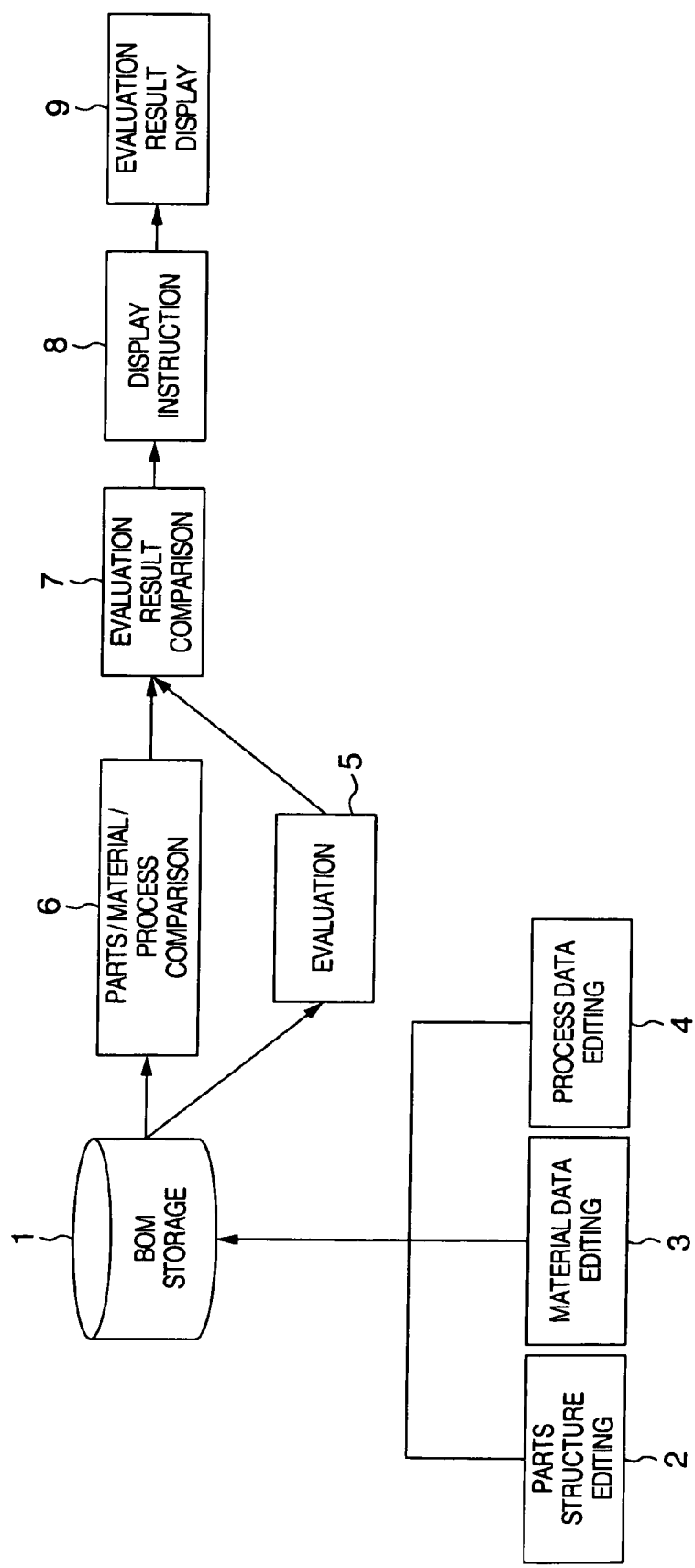
FIG. 1 is a block diagram illustrating the structure of a first embodiment of an evaluation implementation of environmental load according to the present invention.

Embodiments of an evaluation implementation of environmental load will be described with reference to FIGS. 1 to 30. FIG. 1 is a block diagram illustrating the structure of a first embodiment of the evaluation implementation of environmental load according to the present invention. The evaluation implementation of environmental load of FIG. 1 comprises a BOM storage unit 1 for storing information on parts structures, materials, and processes of one or a plurality of products and design plans; a parts structure editing unit 2 for modifying the parts structure in a BOM stored in the BOM storage unit 1; a material data editing unit 3 for modifying material data stored in the BOM storage unit 1; a process data editing unit 4 for modifying process data stored in the BOM storage unit 1; an evaluation unit 5 for evaluating an environmental load based on the parts structure, material, and process included in BOM data from an arbitrary BOM stored in the BOM storage unit 1; a parts/material/process comparison unit 6 for comparing parts structures, materials, and processes in two or more arbitrary BOMs from a plurality of BOMs stored in the BOM storage unit to extract differences; an evaluation result comparison unit 7 for comparing environmental load amounts in a plurality of BOMs based on the difference extracted by the parts structure/material/process comparison unit and the environmental load amount evaluated by the evaluation unit to extract different portions in evaluation values; a display instruction unit 8 for instructing a display method for displaying the differences in structure in the plurality of BOMs and the difference in the evaluation values for comparison in accordance with the different portions in the evaluation values extracted by the evaluation result comparison unit, and the difference in structure extracted by the parts structure/material/process comparison unit; and an evaluation result display unit 9 for displaying the result of the evaluation for the environmental loads based on the instruction of the display instruction unit.

The components of the first embodiment will be described in order. The BOM storage unit 1 is a unit for storing information on parts structure, material, and process of one or a plurality of products or design plans.

Information stored in this storage unit includes (1) information on a hierarchical relationship among parts which make up a product or a design plan, the quantities of parts required for the structure of the product, and the like, (2) information such as a parts number, a parts name, a model or the like which can identify a part, or attributes such as the mass of the part, (3) a code of a material which form part of a part, a material name, and a mass, and (3) information such as a process code, a process name or the like which can identify a process into which a resource is introduced or which discharges an environmental load in a stage of a life cycle for each part and each material, extending from processing of material for the part, through manufacturing of a product, using, and recycle, to disposal, or attribute values related to the process (transported distance and the like when the process is transportation), and the like.

Figure 3:
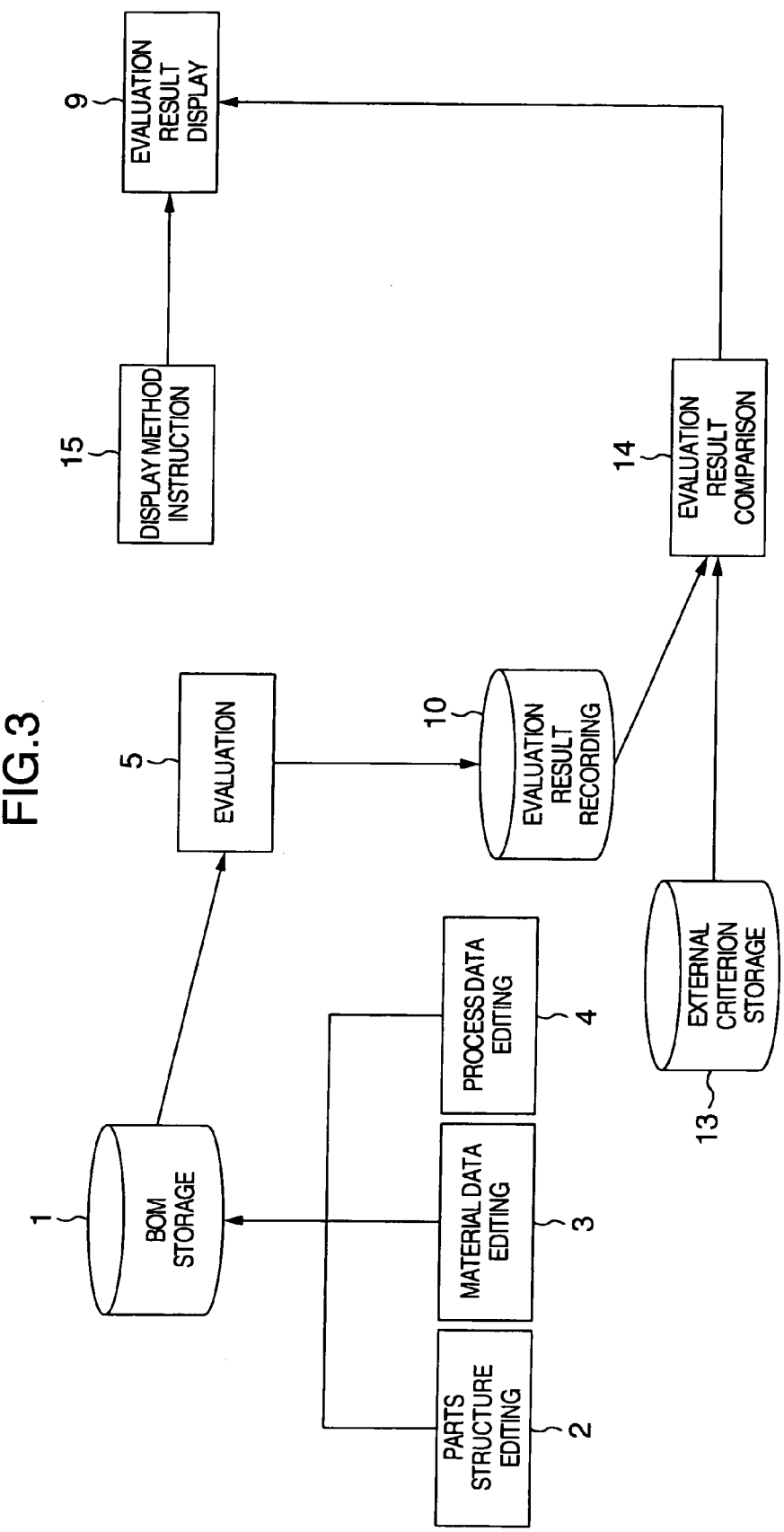
FIG. 3 is a block diagram illustrating the structure of a third embodiment of the evaluation implementation of environmental load according to the present invention.
Figure 4:
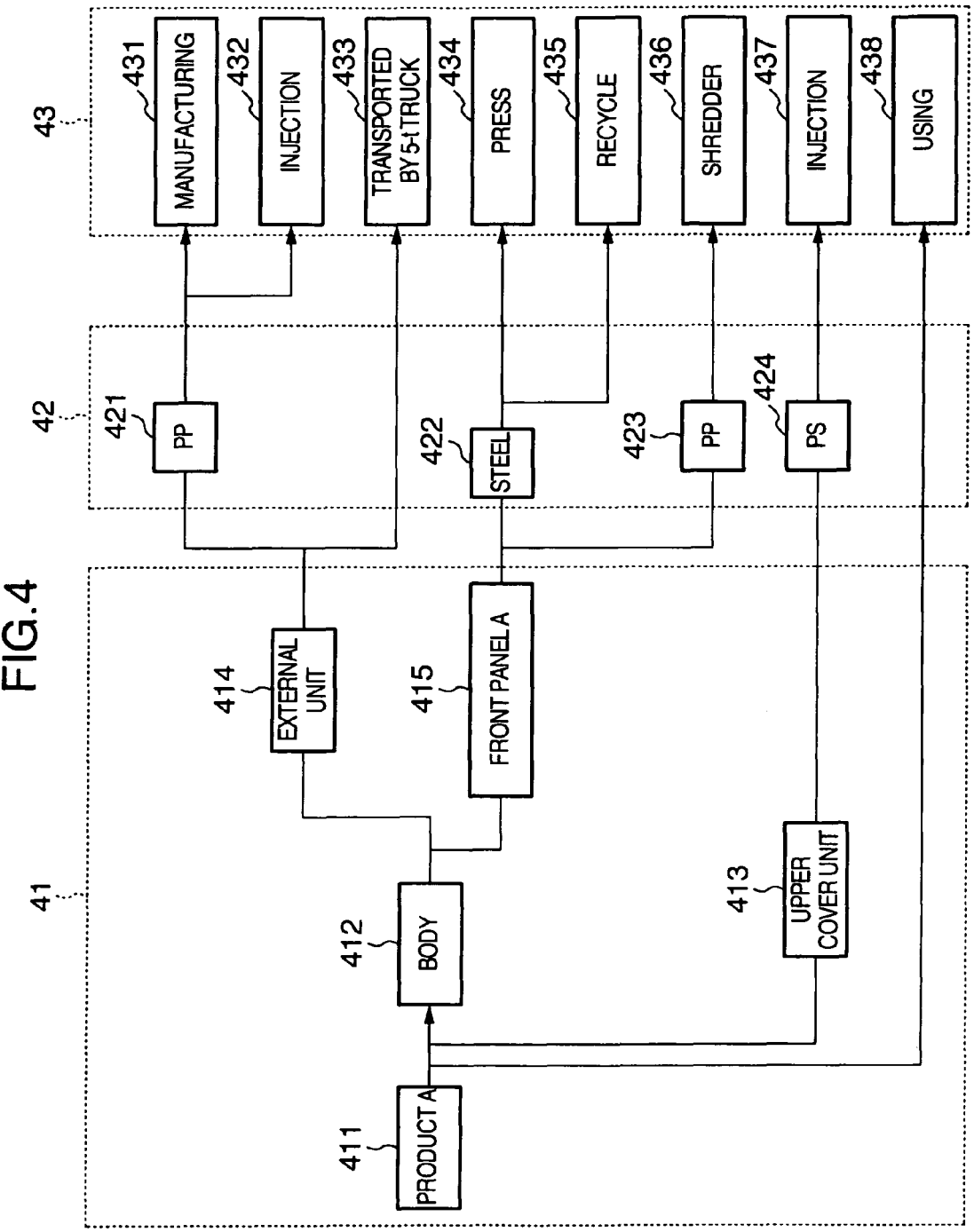
FIG. 4 is a diagram illustrating an example of a schematized structure of data stored in a BOM storage unit 1.
Figure 5:
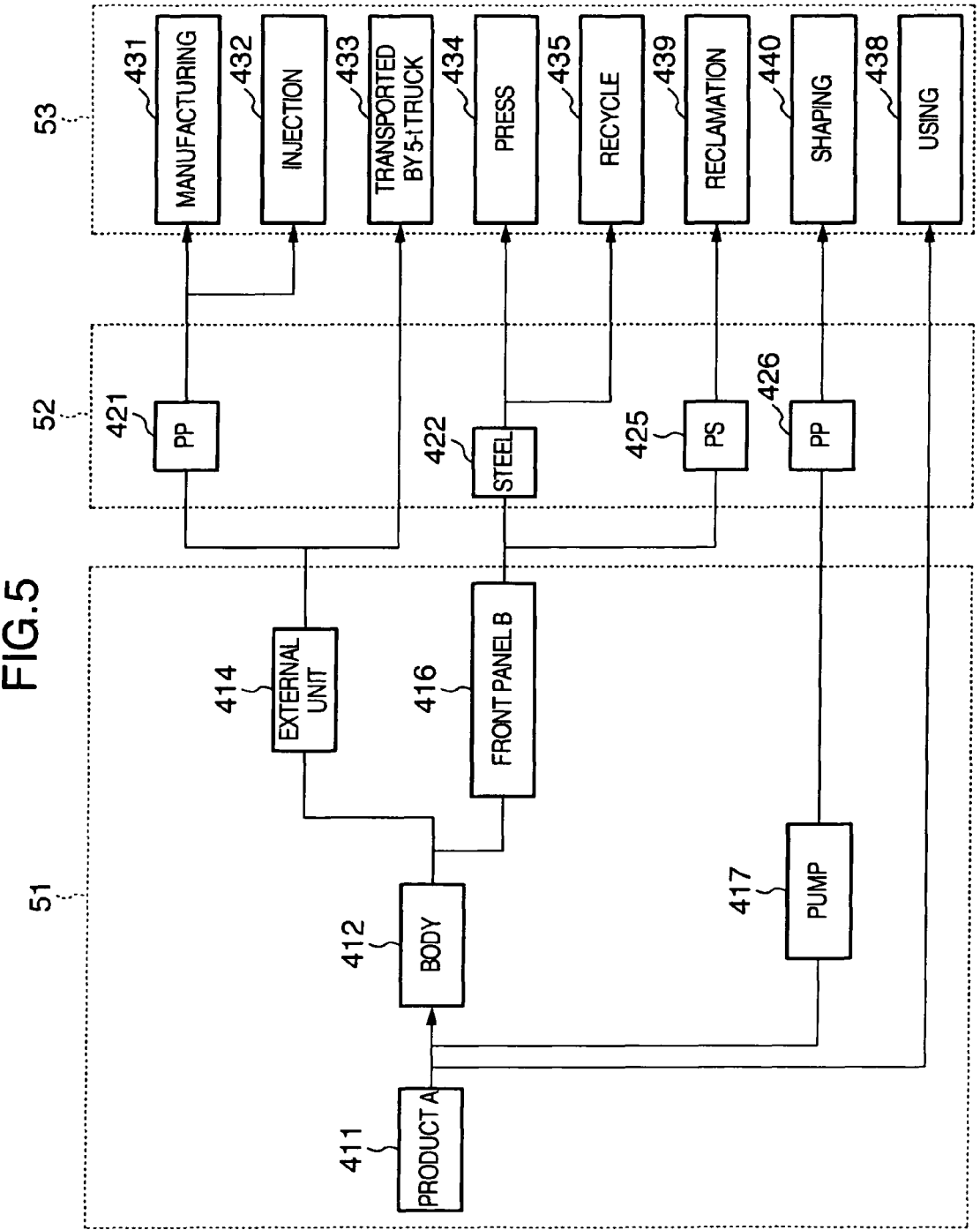
FIG. 5 is a diagram for describing addition, deletion, and modification processing by a parts structure editing unit, a material editing unit, and a process editing unit.

FIG. 4 illustrates a schematic example of the structure of data stored in the BOM storage unit 1. This example shows fictitious data which is simplified for convenience of a description on the data structure. 41 in FIG. 4 designates a BOM which shows the parts structure of a certain product A. 411-415 designate respective elements of a parts tree which make up the product. In this example, the "product A" 411 is composed of a "body" 412 and an "upper cover unit" 413, and the "body" 412 is further composed of an "external unit" 414 and a "front panel" 415. In this example, the "upper cover unit" 413, "external unit" 414, and "front panel" 415 are end parts in the structure of the product, which can no longer be further decomposed, whereas the "product A" 411 and "body" 412 are assemblies. However, either of them is treated as a "part." 42 in FIG. 4 designates a layer of materials which make up the end parts in the BOM 41. They are materials which make up the end parts in the parts included in 41. "PP" in 421 and 423 is a symbol representative of "polypropylene," and "PS" in 424 is a symbol representative of "polystyrene." 43 in FIG. 3 designates a layer of processes associated with each part and material in the BOM 41. The layer 43 of processes represents those processes which impose loads on the environment by introducing or discharging the respective parts and materials in the BOM 41 in life cycle stages from the processing of materials to disposal of the respective parts and materials. For example, in the example of FIG. 4, the "external unit" 414 is associated with a material processing process labeled "processing" 431 of the material PP, or a material machining process labeled "injection" 432 of PP. In addition, it is also associated with a transportation process labeled "transported by 5-t truck." Also, the "product A" 411 can be associated with a using process labeled "using" 438, or a "steel" 422 which forms part of a "front panel" 415 can be associated with a recycle process labeled "recycle" 435, and PP 423 which forms part of the "front panel" 415 can be associated with a disposal process labeled a "shredder" 436.

In this way, the layer of processes comprises those processes which impose loads on the environment over the life cycle of the parts and materials which make up the BOM. The parts structure editing unit 2 in FIG. 1 is a unit for performing editing such as addition, deletion, change and the like of parts for BOMs stored in the BOM storage unit 1. An example of a BOM resulting from addition, deletion, and change of parts in the example of the BOM 41 in FIG. 4 is shown in 51 of FIG. 5. In comparison of the structure of 41 in FIG. 4 with the structure of 51 in FIG. 5, a "pump" 417 is newly added, the "front panel A" 415 is replaced with a "front panel B" 416, and the "upper cover unit" 413 is deleted. Also, though not shown, it is this unit that changes the attributes of a part such as the mass, quantity and the like of the part. Likewise, the material data editing unit 3 is a unit for performing editing such as addition, deletion, and change of materials in BOMs stored in the BOM storage unit 1. An example of a BOM resulting from addition, deletion, and change of materials in the example of the layer of materials in the BOM 42 in FIG. 4 is shown in 52 in FIG. 5. In comparison with the structure of 42 in FIG. 4 with the structure of 52 in FIG. 5, "PP" 426 is newly added, the "PP" 423 is replaced with "PS" 425, and the "PS" 424 is deleted. Also, though not shown, it is this unit that changes the attributes such as the mass of a material.

Likewise, the process data editing unit 4 is a unit for performing editing such as addition, deletion, change and the like of processes in BOMs stored in the BOM storage unit 1. An example of a BOM resulting from addition, deletion, and change of processes in the example of the layer of processes in the BOM 43 in FIG. 4 is shown in 53 in FIG. 5. In comparison with the structure of 43 in FIG. 4 with the structure of 53 in FIG. 5, "shaping" 440 is newly added, the "shredder" 436 is replaced with "reclamation" 439, and the "injection" 437 is deleted.

Also, though not shown, it is this unit that changes the attributes such as process attribute values (a transported distance and the like when the process is transportation) of a process.

The foregoing parts structure editing unit 2, material data editing unit 3, and process editing unit 3 make up a BOM editing unit for creating a new design plan based on the structure of a certain product, and changing the contents of processes to create a design plan which can further reduce an environmental load. The evaluation unit 5 is a unit for calculating an environmental load amount from the information on the parts structures, materials, and processes stored in the BOM storage unit 1, and a standard physical unit of the environmental load previously defined on a process-by-process basis.

There are 20 items or more in three types of environmental loads: those classified into consumption of resources such as crude oil, water and the like; those emitted into the atmosphere such as $CO_2$, SOx and the like; and those emitted into the hydrosphere such as BOD and COD, but the following evaluation is made for all or part of environmental load items in accordance with the purpose.

A method of calculating the environmental load is generally found, for example, by using the following equation described in Section 4 of "Actual Environment Adapted Designing" (edited and written by Yoshiaki Ichikawa), Ohmsha, Ltd., Publishing Station:

$$A = \Sigma(a \times W) \quad \text{(Equation 1)}$$

W: Weight, Machining Amount, or the like for each of materials which make up a product (enter for every product of interest);

a: Standard Physical Unit for each environmental load item;

A: Amount of consumption or emission for each item (output).

In FIG. 4, there are processes which impose loads on the environment as shown in 43, where the calculation of a×W for each of processes results in the amount of load imposed on the environment as a result of executing the process.

Here, the standard physical unit a for each environmental load item is assumed to previously have data. FIG. 6 shows an example of the standard physical unit data for each environmental load item (the values are fictitious). An example of $CO_2$ is shown as an environmental load item. The standard physical unit data has a set of information such as the process name, environmental load item, value, unit and the like, and, for example, as shown on the first data row, is defined as a mass with respect to a unit mass of a material or a part, such as the amount of emitted $CO_2$ when 1 kg of PP is manufactured is 500 g. They may take the values described in an inter-industry relation table as they are, or individually measured values may be used for those which can be directly or indirectly measured, such as an environmental load amount originating from the amount of power used in a particular factory.

When this is used to find the environmental load amount, for example, for the BOM of FIG. 4, the processes included in 43 are read in sequence, and the values of records which match the process name are read and accumulated from the masses of materials or parts handled in the respective processes and the standard physical unit data in FIG. 6 to find the environmental load amount. For example, assuming that the mass of the "PP" 421 in FIG. 4 is 5 kg, the environmental load amount of the PP processing process 431 is calculated to be 2500 g (=5×500) of $CO_2$ from the values in FIG. 6.

Figure 7:
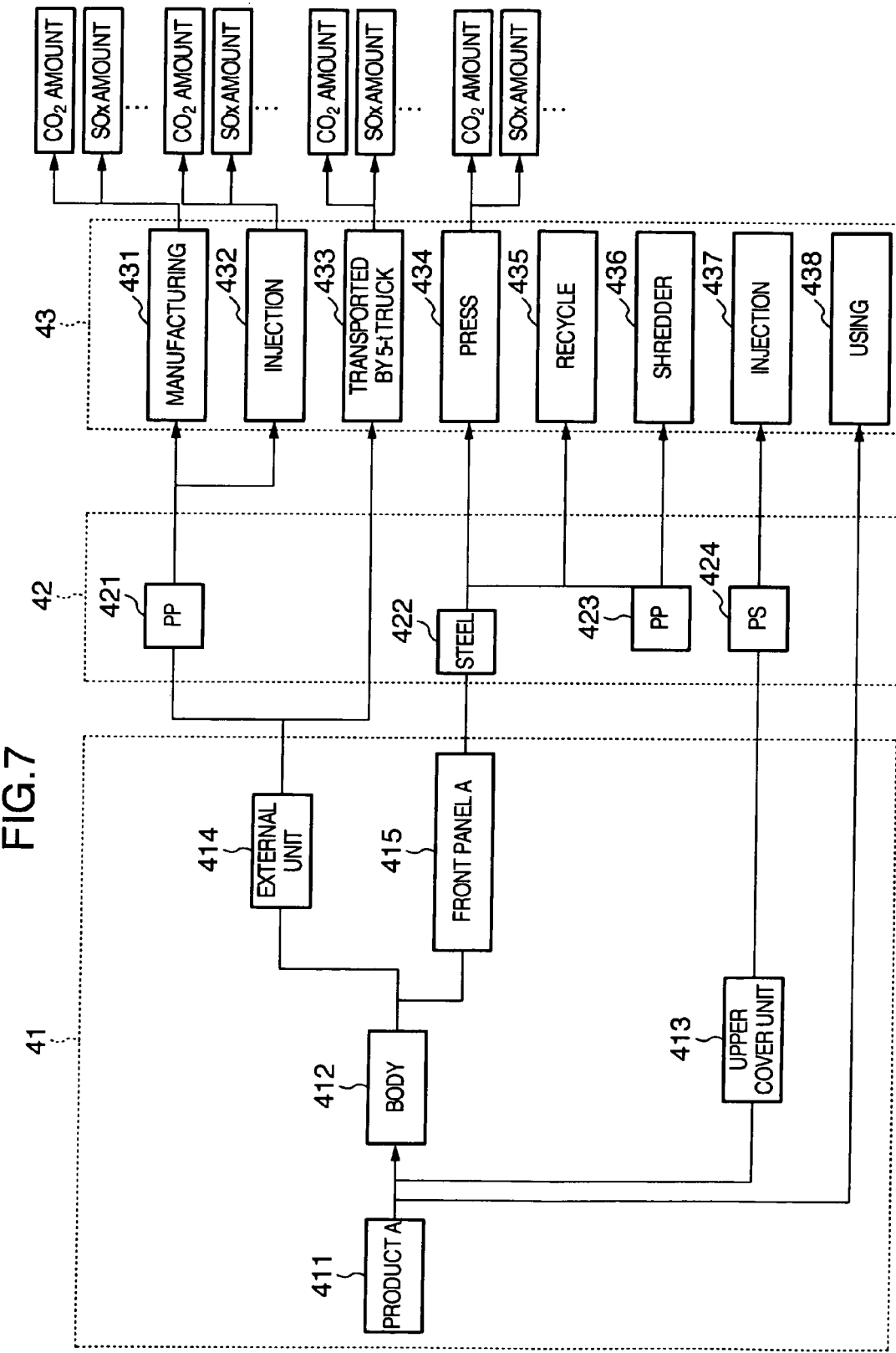
FIG. 7 is a diagram for describing an environmental load amount calculated for each process during the processing of an evaluation unit.

In the foregoing manner, the environmental load amount over the life cycle of a product is calculated in units of parts x materials x processes. At the time the environmental load calculations have been fully completed, the environmental load amount has been calculated for each environmental load item for all processes as shown in FIG. 7. While only $CO_2$ and SOx are given herein as examples of the environmental load items, all environmental load items may be calculated for each process. Also, depending on a combination of the process and environmental load, some combinations do not consume or emit the pertinent environmental load item, so that the environmental load amount is defined to be zero for such combinations.

Figure 21:
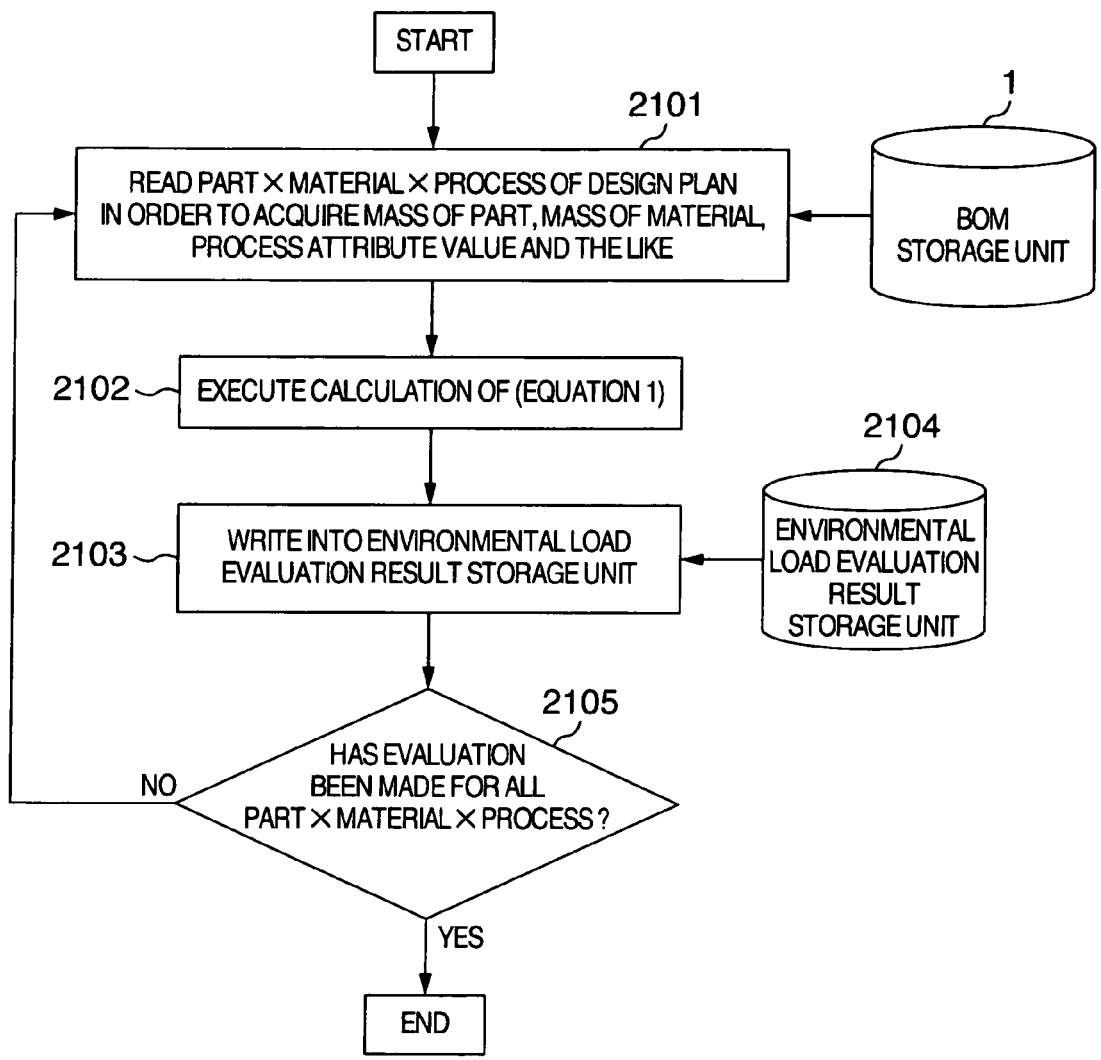
FIG. 21 is a diagram for describing a processing flow of an evaluation unit.

The processing flow of the evaluation unit 5 will be described with reference to FIG. 21. In processing 2102, parts x materials x processes of a plurality of design plans to be compared are read in sequence from the BOM storage unit 1 to acquire the parts mass, material mass, process attribute value and the like. The process attribute value refers to a value other than the mass, which is required for the environmental load calculation such as a transported distance, for example, when the process is a transportation process, a using time when the process is using. In processing 2102, the environmental load calculation of Expression 1 is performed using the values acquired in processing 2101. In processing 2103, the result of the calculation in processing 2102 is written into the environmental load evaluation result storage unit 2104. In processing 2105, it is determined whether or not the evaluation has been completed for all parts x materials x processes. When completed, the processing is terminated, whereas when not completed, the processing is advanced for the next part x material x process.

Exemplary contents of the items stored in the environmental load evaluation result storage unit 2104 used in this processing is shown in FIG. 22. A process is identified by respective items, a design plan 2201, a part 2202, a material 2203, and a process 2204, and the type of the environmental load is stored in 2205, and the environmental load value calculated in processing 2102 in 2206. The foregoing is the contents of the evaluation unit 5.

The parts/material/process comparison unit 6 is a unit which compares the contents of the parts structure, material, and process for two or more arbitrary BOMs from among a plurality of BOMs stored in the BOM storage unit 1 to extract different portions. Also, while performing the comparison, the parts/material/process comparison unit 6 simultaneously performs processing for establishing a correspondence relationship of the parts, materials, and processes among a plurality of BOMs. The parts/material/process comparison unit 6 is intended to compare a plurality of products or design plans to extract different portions therefrom. The design plan herein referred to includes the parts structure, material, and process, as described in FIG. 4, and is a device for extracting a difference of a design plan which is likely to cause a difference in the environmental load amount calculated by the evaluation unit 5. It is contemplated that patterns of differences resulting from the comparison made by the parts/material/process comparison unit 6 may be (1) when the parts structure is different, (2) when materials are different, (3) when processes are different, or a combination of these. As shown in FIG. 4, the material is an attribute of the part, and the process is an attribute of the part or material, so that the parts, materials, and processes are corresponded in this order from the higher rank for making the comparisons.

Figure 8:
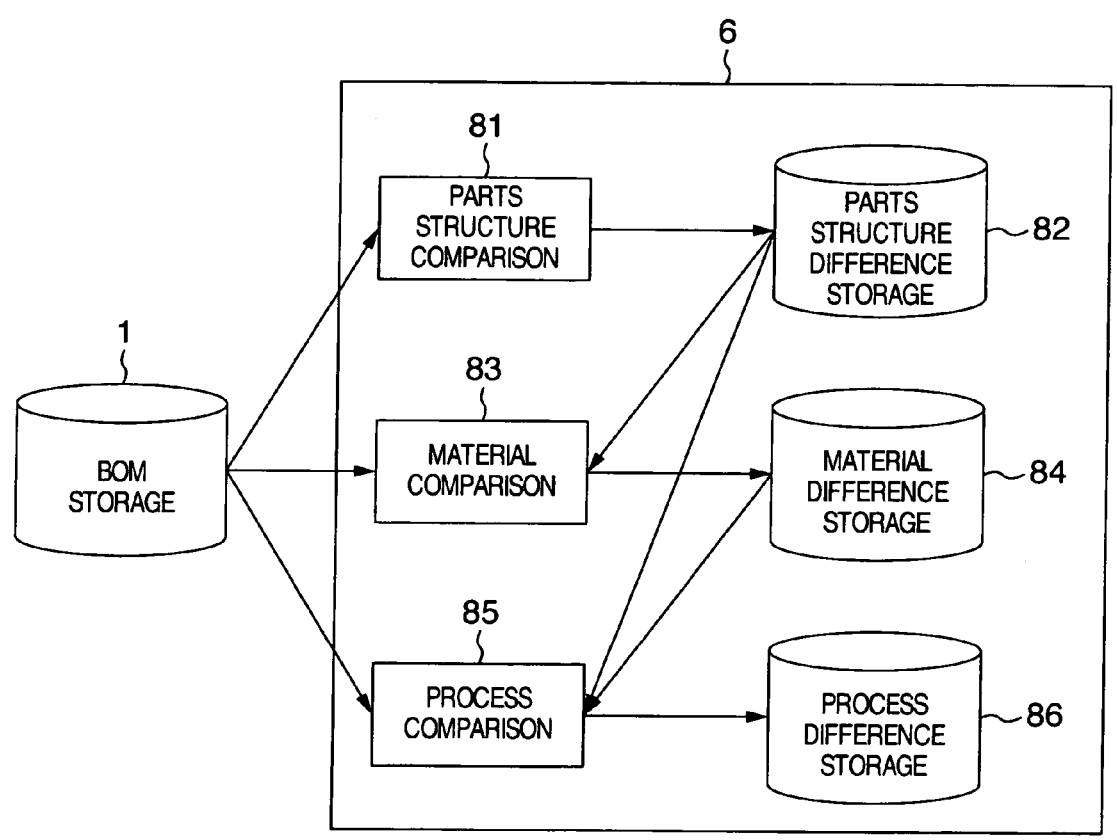
FIG. 8 is a diagram for describing the structure of a parts/material/process comparison unit in detail.

A further detailed structure of the parts/material/process comparison unit 6 is illustrated in FIG. 8. 1 in the figure is the same as the BOM storage unit 1, and 6 surrounded by a frame shows components of the parts/material/process comparison unit 6 in FIG. 1 in greater detail, using 81-86. A parts component comparison unit 81 in FIG. 8 is a unit for comparing differences between the parts structures in a plurality of BOMs to be compared, from the BOM storage unit 1. A parts structure difference storage unit 82 is a unit for storing difference information resulting from the comparison made by the parts structure comparison unit 81. A material difference comparison unit 83 is a unit for comparing differences between materials which are attributes of parts in the plurality of BOMs to be processed, from the BOM storage unit 1. A material difference storage unit 84 is a unit for storing difference information resulting from the comparison made by the material comparison unit 83. A process difference comparison unit 85 is a unit for comparing differences between processes which are attributes of parts or materials in the plurality of BOMs to be compared. A process difference storage unit 86 is a unit for storing difference information resulting from the comparison made by the process difference comparison unit 85.

The parts/material/process comparison unit 6 stores the differences in parts, materials, and processes among the BOMs to be compared in the parts structure difference storage unit 82, material difference storage unit 84, and process difference storage unit 86. 82, 84, 86 are units for storing information resulting from the comparisons, and are units for storing information for displaying the differences in the results of the evaluations, which is also an object of the present invention, so that even storage in a memory may be performed in the form of a database or a file if preservation is needed.

An exemplary implementation of the parts/material/process comparison unit 6 will be described on the basis of the structure of FIG. 8. Since the parts/material/process comparison unit 6 is intended to separate the same portions from different portions of components (parts, materials, processes) among a plurality of design plans, the method given as an example need not be necessarily used, but any method may be used as long as it can achieve the aforementioned objects.

The parts structure comparison unit 81 compares BOMs with one another among a plurality of design plans to extract differences in parts structure. Here, when parts are compared, items subjected to the comparison have been previously stored from among part attributes stored in the BOM storage unit 1. This is because differences of structures which affect the environmental load value of a product as a result must be extracted when different number of parts are used in the product, when the mass per part is different, and the like. For this reason, items of part attributes have been previously specified as affecting the environmental load value.

FIG. 9 shows exemplary items to be compared of attributes of a part. For example, assuming that a design plan A is compared with a design plan B, the respective items, parts code 91, parts name 92, mass 93, and quantity 94 are compared in order for parts which make up the design plan A and design plan B. When different, different items are stored in the parts structure difference storage unit 82.

Exemplary items stored in the parts structure difference storage unit 82 are shown in FIG. 10. Column 1001-column 1008 are examples of items stored in the parts structure difference storage unit 82, while a row 1009 and a row 1010 are examples of stored data. The column 1001 stores a design plan which is the basis for comparison, and the column 1002 stores a parts code in the design plan of the comparison basis, so that a part of the comparison basis is identified by these two items. The column 1003 stores a design plan to be compared, and the column 1004 stores a parts code to be compared, so that a part to be compared is identified by these two items. The column 1005-column 1008 store items of attributes to be compared, which have been given in FIG. 9. In this embodiment, as an example, for the parts code in the column 1005, the parts name in the column 1006, the mass in the column 1007, and the quantity in the column 1008, differences are compared between two parts identified by the column 1001 to column 1004, and the contents of the differences are extracted and stored by the parts structure comparison unit 81. It should be noted that, as a result of the comparison, information on all parts included in a plurality of design plans to be compared are recorded in any records.

Figure 11:
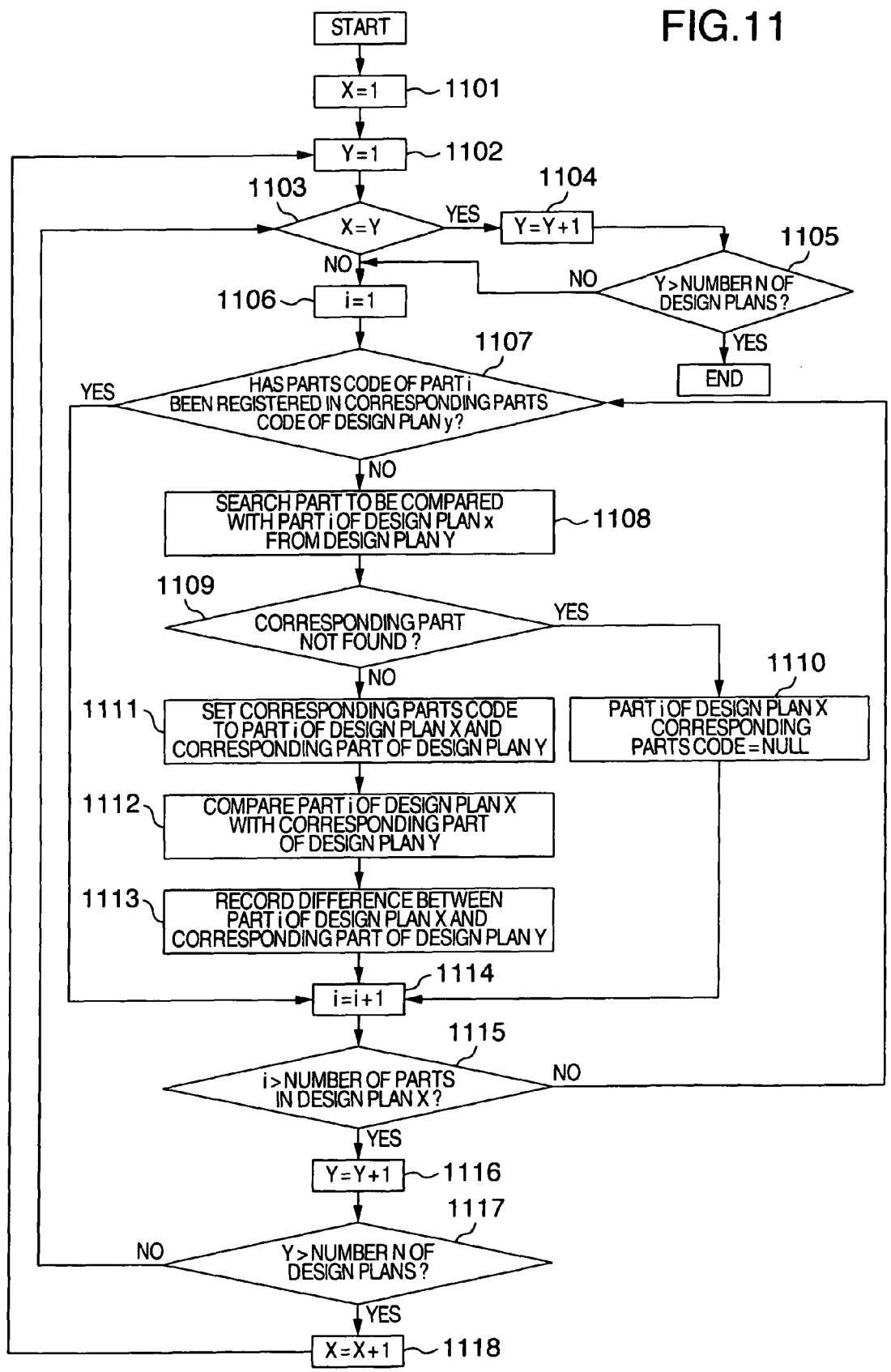
FIG. 11 is a diagram for describing a processing flow for a comparison in a parts structure comparison unit.

The processing flow for the comparison of the parts structure comparison unit 81 is illustrated in FIG. 11. Assume that N design plans are compared. Assume that parts which make up each design plan are designated serial numbers, such that information stored in the BOM storage unit 1 can be referenced for each part. For comparing the N design plan in order, assume that a basic design plan counter x and a compared design plan counter y are provided so that the comparisons are made as the counters are advanced. Assume also that the counter for the parts number of the basic design plan is designated by i.

In processing 1101, the basic comparison design plan counter is set to one. In processing 1102, the compared design counter is set to 1. In processing 1103, it is determined whether or not the basic design plan counter x is equal to the compared design plan counter y. This is because the same design plans need not be compared with each other. When equal, the flow proceeds to processing 1104. When different, the flow proceeds to processing 1106. In processing 1104, the compared design plan counter is advanced by one. In processing 1105, it is determined whether or not the compared design plan counter exceeds the number N of design plans. If exceeded, the processing is terminated because both the basic design plans and compared design plans have exceeded the number of design plans through the flow of the processing 1103 and processing 1104. If not exceeded, the flow proceeds to processing 1106. In the processing 1106, the part counter is set to one. In processing 1107, it is determined whether or not the parts code of a part i has been previously registered in corresponding parts codes of the compared design plan. This processing is intended to avoid a repeated comparison when a current basic design plan has been compared in reverse with the design plan to be compared. If not registered, it is determined that the part i has not been compared, followed by the flow advancing to processing 1108.

In processing 1108, a part to be compared with the part i of the basic design plan x is searched from the compared design plan y. The search for a part to be compared will be described later. In processing 1109, it is determined whether or not there is a corresponding part as a result of the search in the processing 1108. If there is no corresponding part, the flow proceeds to processing 1110. If there is a corresponding part, the flow proceeds to processing 1111. In processing 1110, NULL is entered in a corresponding parts code of the part i of the design plan x in the parts structure difference storage unit 82. For example, when the basic design plan is the design plan A, the compared design plan is the design plan B, and the parts code of the part i under processing is a part 12, the value is added as in a row 1009 in FIG. 10. In processing 1111, a corresponding parts code is set for the part i of the design plan x and the corresponding part of the design plan y. This is for convenience of processing for comparing materials or processes with each other between corresponding parts when materials and processes are compared after the comparison of the part components. For example, assuming that the part i under processing is a part 2 of the design plan A, and the parts code of the corresponding part of the design plan B is a part 2', the setting is as shown in the row 1010 in FIG. 10. In processing 1112, the part i of the design plan x is compared in attributes with the corresponding part of the design plan y. The comparison made herein involves comparing the items shown in 91-94 in FIG. 9 in order for the part i of the design plan x and the corresponding part of the design plan y. In processing 1113, differences between the part i of the design plan x and the corresponding part of the design plan y are recorded from the result of the comparison in the processing 1112. For example, only information as to whether they are the same or different may be written as in the row 1010 of FIG. 10, or different contents may be described. Even the information as to whether they are the same or different enables details on the difference to be referenced by referencing the BOM storage unit 1 with the parts code, so that any method may be used. In processing 1114, the part counter i is advanced by one. In processing 1115, it is determined whether or not the processing has been completed for all parts of the design plan x. If there is any part which has not been processed, the flow returns to processing 1107, while if the processing has been terminated for all the parts, the flow proceeds to processing 1116. In processing 1116, the counter of the compared design plan y is advanced by one. In processing 1117, it is determined whether or not the compared design plan y exceeds the number N of design plans. If exceeding, the flow proceeds to processing 1118, whereas if not exceeding, the flow proceeds to processing 1103. In the processing 1118, the counter of the basic design plan x is advanced by one, followed by the flow returning to the processing 1102. The foregoing is the flow of the processing in the parts structure comparison unit 81. An end condition for this processing is determined in processing 1105. It should be noted that while a part to be compared is searched for in the processing 1108, this embodiment assumes that between design plans, parts to be compared can be corresponded from any of information possessed by each part. The condition for the correspondence is met, for example, when the parts names are the same, when lower parts structures of the parts match, when part attributes match, and the like. It is the processing 1108 that has thus determined the condition for part correspondence, and searches for a pertinent corresponding part from the compared design plan. Also, a method which can be employed for simplicity of comparison can involve designating parts identical in role by a parts role code of the same number in view of the product structure, such that a part to be compared can be detected through the correspondence of the code.

A method which can be taken when there is no information with which an object to be compared can be identified among parts may involve making comparisons among all parts between the design plans with one another, selecting the one having the highest similarity for a compared item as a part to be compared, and making a comparison between the parts to be compared.

Next, the material comparison unit 83 will be described. The material comparison unit 83 is a unit which compares materials included in parts which have been designated as corresponding parts by the parts structure comparison unit 81.

FIG. 12 shows exemplary items for attributes of a material to be compared. Since they are those items which produce differences in the environmental load value, the respective items of, for example, the material code 121, material name 122, and mass 123 are compared in order. If different, an item which presents a difference is recorded in the material difference storage unit 84.

Exemplary items stored in the material difference storage unit 84 are shown in FIG. 13. Columns 1301-1309 show examples of items stored in the parts structure difference storage unit 82, and a row 1310 and a row 1311 show examples of stored data. The column 1301 stores a design plan which is the basis for comparison, the column 1302 stores a parts code in the design plan of the comparison basis, and the column 1303 stores a material code of the comparison basis, so that a material of comparison basis is identified by these three items. The column 1304 stores a design plan to be compared, the column 1305 is a parts code to be compared, and the column 1306 stores a material code to be compared, so that a material to be compared is identified by these three items. The column 1307 to column 1309 store items of attributes to be compared, which have been given in FIG. 12. In this embodiment, as an example, for the material code on the column 1307, the material name on the column 1308, and the mass on the column 1309, differences are compared between two materials identified by the column 1301 to column 1306, and the material comparison unit 83 extracts and records the contents of the differences.

Figure 14:
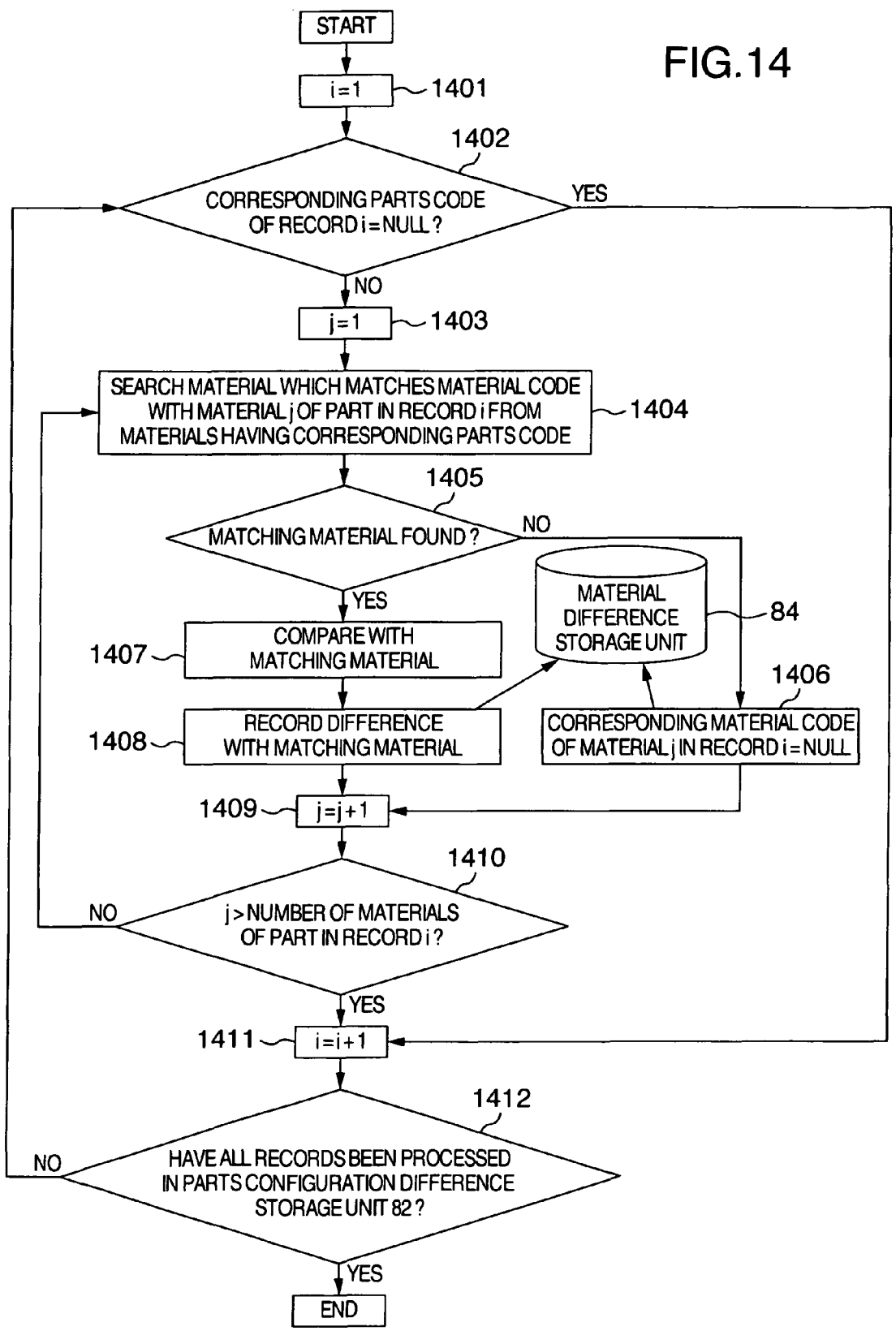
FIG. 14 is a diagram for describing a processing flow of a material comparison unit.

FIG. 14 illustrates a processing flow of the material comparison unit 83. In this processing, when a difference is found as a result of comparing respective materials among corresponding parts of a plurality of design plans stored in the parts structure difference storage unit 81, the difference is recorded in the part difference storage unit 84. Therefore, this embodiment employs a procedure which involves referencing records (rows) in the parts structure difference storage unit 81 in sequence, and comparing materials of corresponding parts recorded in respective records. During the processing, i represents a counter for the records within the parts structure difference storage unit 81, and j represents a counter for referencing in sequence those materials which are included in a basic part. In processing 1401, the record counter of the parts structure difference storage unit 81 is set to one. In processing 1402, it is determined whether or not a corresponding parts code (column 1004 in FIG. 10) of the record i is NULL. If NULL, no material can be compared because there is no corresponding part, so that the flow proceeds to processing 1411, where the record counter of objects to be processed is advanced. If not NULL, the flow proceeds to processing 1403. In the processing 1403, the material counter is set to one. In processing 1404, a j-th material of a part which can be identified by the design plan (column 1001 in FIG. 10) and parts code (column 1002 in FIG. 10) of the record i is read from the BOM storage unit 1, and it is found whether or not a material which matches the material code exists in materials of a part which can be identified by the compared design plan (column 1003 in FIG. 10) and corresponding parts code (column 1004 in FIG. 10). In processing 1405, it is determined whether or not there is the material code which matches in the processing 1404. If there are matching materials, the flow proceeds to processing 1407, whereas if there is no matching material, the flow proceeds to processing 1406. In the processing 1406, since there is no matching material, NULL is entered in the corresponding material code of the material j in the record i. For example, if the record i currently processed in the parts structure difference storage unit 81 is the row 1011 in FIG. 10, the material j of the part 12 of the design plan A is compared with the material of the part 12 of the design plan B. If there is no corresponding material as a result, a record of a row 1310 in FIG. 13 is newly created in a material re-storage unit 83, and NULL is entered in the corresponding material code. In processing 1407, if it is determined in the processing 1405 that there are matching materials, attributes of the matching materials are compared with each other. Items to be compared are those attributes which are thought to affect the environmental load value, as shown in 121-123 in FIG. 12. In this embodiment, for example, the respective items of the material code, material name, and mass are read from the BOM storage unit 1 for comparison. In the processing 1408, differences resulting from the comparison in the processing 1407 are stored in a record newly added to the material difference storage unit 84. For example, the differences are recorded as the column 1307 to column 1309 of a row 1311 in FIG. 13. In this embodiment, the presence (○) or absence (X) of difference alone is recorded, but the contents of difference may be specifically described. In processing 1409, the material counter j for the parts code which can be identified by the record i is advanced by one. In processing 1410, it is determined whether or not the material counter j exceeds the number of materials of parts which can be identified by the record i. If exceeding, the flow proceeds to processing 1411, whereas if not exceeding, the flow proceeds to processing 1404. In the processing 1411, the record counter i of the parts structure difference storage unit 82 is advanced by one. The flow proceeds to the comparison processing for the next part. In processing 1412, it is determined whether or not the processing has been completed for all records in the parts structure difference storage unit 82. If completed, the processing of the material comparison unit 83 is terminated. If not completed, the flow proceeds to the processing 1402, and goes to the processing for the next record. The foregoing embodiment of material comparison has described a method of comparing material attributes such as the mass on the assumption that a material can be uniquely identified by the material code, after a correspondence has been established by the material code. The correspondence is not limited to the material code but may be made with the material name or another material attribute as long as it is based on a criterion for the comparison intended by the user.

Next, the process comparison unit 85 will be described. Processes in the environmental load evaluation have a variety of types over all stages of the life cycle, such as the PP material processing 431, transportation 433, using 438 and the like, for example, as shown in 43 in FIG. 4. Also, each process is associated with a material (for example, "press" 434 is a machining process associated with a material of the "steel" 422, or associated with a part ("transported by 5-t truck" 433 is a transportation process associated with the part of the "external part" 414). Therefore, the process comparison unit 85 involves processing for comparing processes among all corresponding parts and corresponding materials between design plans to be compared.

FIG. 15 shows exemplary items of attributes of a process to be compared. Since they are items which cause a difference in the environmental load value, the respective items of a process code 151, a process name 152, and a process attribute value 153 are compared in order. The process attribute value is, for example, a distance (km) involved in transportation when the process is "transportation," a total using time (hr) when the process is "using," and the like. This is the value corresponding to the machining amount W in Equation 1. When these process attributes are different, different items are stored in the process difference storage unit 86.

Exemplary items stored in the process difference storage unit 86 are shown in FIG. 16. A column 1601 to a column 1611 show examples of items stored in the parts structure difference storage unit 82, and a row 1312 to a row 1316 are examples of stored data. The column 1601 stores a design plan which is the basis for comparison, the column 1602 stores a parts code for the comparison basis, the column 1603 stores a material code for the comparison basis, and the column 1604 stores a process code for the comparison basis, so that a process of the comparison basis is identified by these four items. The column 1605 stores a design plan to be compared, the column 1606 stores a parts code to be compared, the column 1607 stores a material code to be compared, and the column 1608 stores a process code to be compared, so that a process to be compared is identified by these four items. The column 1609 to column 1611 store items of attributes to be compared, which have been given in FIG. 15. In this embodiment, differences are compared between two processes identified by the columns 1601 to column 1608 for the process code in the column 1609, the process name in the column 1610, and the mass in the column 1611, by way of example, and the contents of differences are extracted and recorded by the process comparison unit 85.

Figure 17:
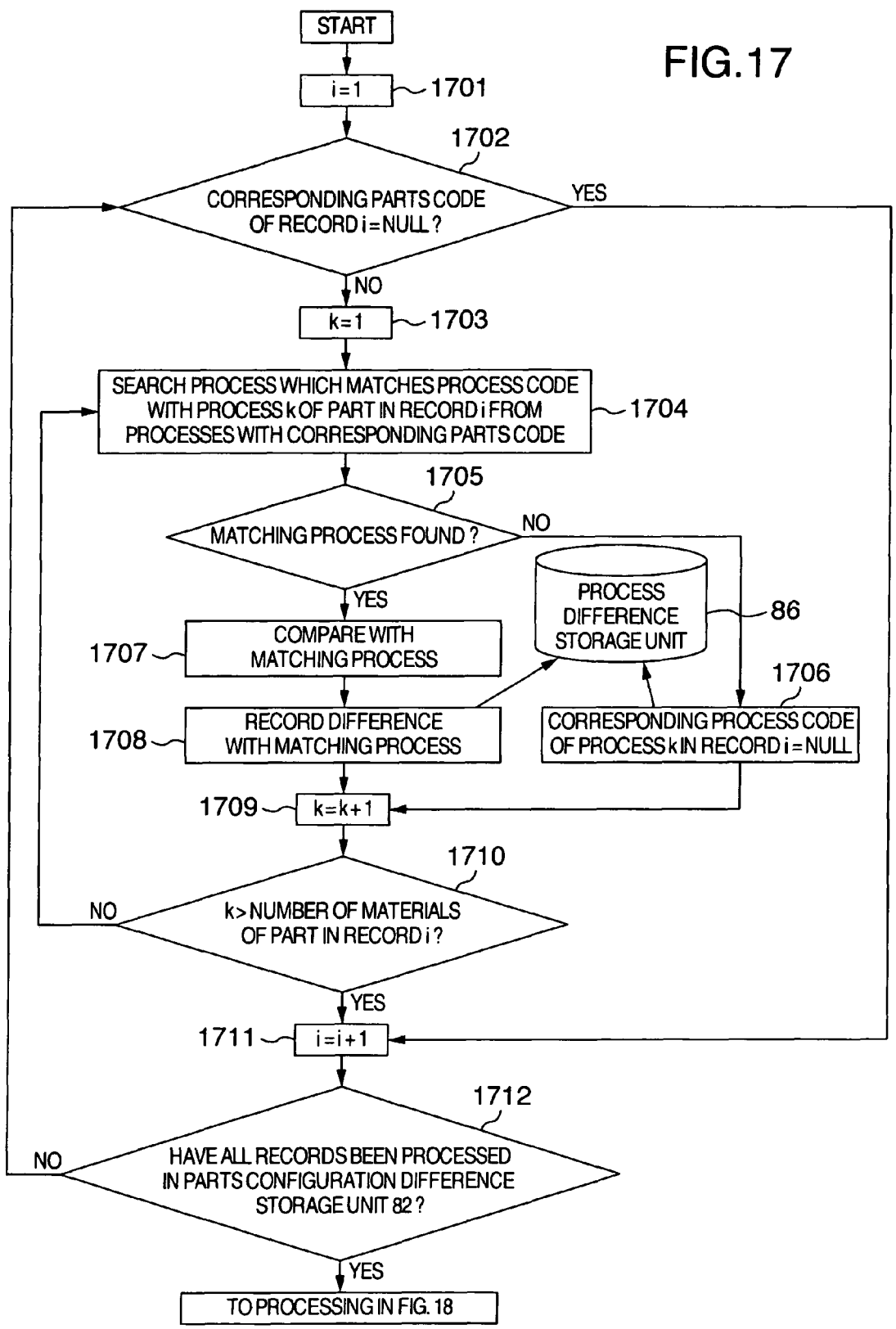
FIG. 17 is a first diagram for describing a processing flow of a process comparison unit.
Figure 18:
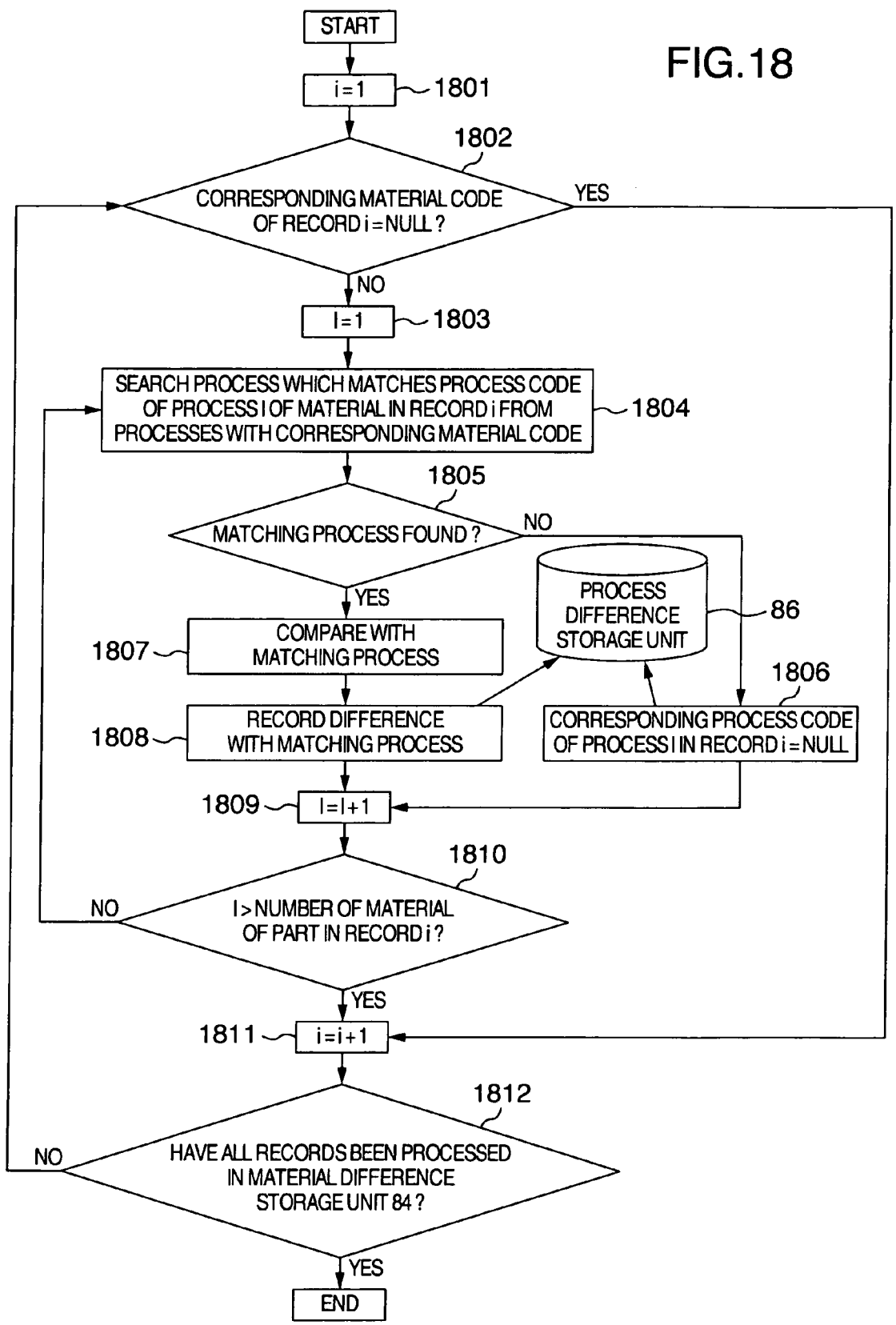
FIG. 18 is a second diagram for describing the processing flow of the process comparison unit.

The processing flow of the process comparison unit 85 is illustrated in FIGS. 17 and 18. As described above, there are processes associated with parts and processes associated with materials. Therefore, in the processing of FIG. 17, information relating to corresponding parts between design plans is first retrieved in order from the parts structure difference storage unit 82, processes associated with the respective parts are compared with each other, and differences are stored in the process difference storage unit. Then, in the processing of FIG. 18, information relating to corresponding materials between the design plans is next retrieved in order from the material difference storage unit 84, processes associated with the respective materials are compared with each other, and differences are stored in the process difference storage unit.

Referring first to FIG. 17, a description will be given of the flow of comparison processing for differences in processes associated with parts. During the processing, i represents a record counter within the parts structure difference storage unit 81, while k represents a counter for referencing in order the processes associated with a basic part. In processing 1701, the record counter of the parts structure difference storage unit 81 is set to one. In processing 1702, it is determined whether or not a parts code (column 1004 in FIG. 10) corresponding to the record i is NULL. If NULL, no processes can be compared because there is no corresponding part, so that the flow proceeds to processing 1711, where the counter of a record to be processed is advanced. If not NULL, the flow proceeds to processing 1703. In the processing 1703, the process counter is set to one. In processing 1704, a k-th process for a part which can be identified by a design plan (column 1001 in FIG. 10) and a parts code (column 1002 in FIG. 10) of the record is read from the BOM storage unit 1, and it is found whether or not a process which matches the process code exists in processes of a part which can be identified likewise by the compared design plan (column 1003 in FIG. 10) and corresponding parts code (column 1004 in FIG. 10) of the record i. In processing 1705, it is determined whether or not there are process codes which match in the processing 1704. If there are matching processes, the flow proceeds to processing 1701, whereas if there is no matching process, the flow proceeds to processing 1706. In processing 1706, since there is no matching process, NULL is entered in the corresponding process code of the process k of the record i in the process difference storage unit 86. For example, assuming that the currently processed record i in the parts structure difference storage unit 81 is the row 1011 in FIG. 10, the process k of the part 12 in the design plan A is compared with the process of the part 12 in the design plan B. If there is no corresponding process as a result, a record of a row 1614 in FIG. 16 is newly created in the process difference storage unit 86, and NULL is entered in the corresponding process code. In processing 1707, attributes of matching processes are compared with each other. Items to be compared are those attributes which are thought to affect the environmental load value, for example, as shown in 151-153 in FIG. 15. In this embodiment, the respective items of the process code, process name, and process attribute value, for example, are read from the BOM storage unit 1 for comparison. In processing 1708, differences resulting from the comparison in the processing 1707 are recorded in a record newly added to the process difference storage unit 86. For example, they are recorded as in a column 1609 to a column 1611 on a row 1615 in FIG. 16. In this embodiment, the presence (○) or absence (X) of difference alone is recorded, but the contents of difference may be specifically described. In processing 1709, the process counter k for a parts code which can be identified by the record i is advanced by one. In processing 1710, it is determined whether or not the process counter k exceeds the number of processes of the part which can be identified by the record i. If exceeding, the flow proceeds to processing 1711, whereas if not exceeding, the flow proceeds to the processing 1704. In the processing 1711, the record counter i of the parts structure difference storage unit 82 is advanced by one, and the flow goes to the comparison processing for the next part. In processing 1712, it is determined whether or not the processing has been completed for all records in the parts structure difference storage unit 82. If completed, the process comparison processing associated with the part is terminated, followed by a shift to the process comparison processing associated with the material (FIG. 18). If not completed, the flow proceeds to the processing 1702 and goes to the processing for the next record.

Referring next to FIG. 18, a description will be given of the flow of difference comparison processing for the process associated with the material. During the processing, i represents a record counter in the material difference storage unit 83, while 1 represents a counter for referencing processes associated with a basic material in order. In processing 1801, the record counter of the material difference storage unit 83 is set to one. In processing 1802, it is determined whether or not a material code (column 1306 in FIG. 13) corresponding to the record i is NULL. If NULL, no processes can be compared because there is no corresponding material, so that the flow proceeds to processing 1811, where the counter of a record to be processed is advanced. If not NULL, the flow proceeds to processing 1803. In the processing 1803, the process counter is set to one. In processing 1804, a l-th process for a part which can be identified by a design plan (column 1301 in FIG. 13), a parts code (column 1302 in FIG. 13), and a corresponding material code (column 1306 in FIG. 13) of the record i is read from the BOM storage unit 1, and it is found whether or not a process which matches the process code exists in processes of a material which can be identified likewise by the compared design plan (column 1303 in FIG. 13), corresponding parts code (column 1304 in FIG. 13), and corresponding material code (column 1306 in FIG. 13) of the record i. In processing 1805, it is determined whether or not there is a process code which matches in the processing 1804. If there are matching processes, the flow proceeds to processing 1807, whereas if there is no matching process, the flow proceeds to processing 1806. In processing 1806, since there is no matching process, NULL is entered in the corresponding process code of the process 1 of the record i in the process difference storage unit 86. For example, assuming that the currently processed record i in the material difference storage unit 83 is the row 1311 in FIG. 13, the process 1 for a material 1 of the part 11 in the design plan A is compared with the process of the material 1 for the part 11 in the design plan B. If there is no corresponding process as a result, a record of a row 1613 in FIG. 16 is newly created in the process difference storage unit 86, and NULL is entered in the corresponding process code. In processing 1807, attributes of matching processes are compared with each other if it is determined in the processing 1805 that there are matching processes. Items to be compared are those attributes which are thought to affect the environmental load value, for example, as shown in 151-153 in FIG. 15. In this embodiment, the respective items of the process code, process name, and process attribute value, for example, are read from the BOM storage unit 1 for comparison. In processing 1808, differences resulting from the comparison in the processing 1807 are recorded in a record newly added to the process difference storage unit 86. For example, they are recorded as in a column 1609 to a column 1611 on a row 1615 in FIG. 16. In this embodiment, the presence (○) or absence (X) of difference alone is recorded, but the contents of difference may be specifically described.

In processing 1809, the process counter 1 for a parts code which can be identified by the record i is advanced by one. In processing 1810, it is determined whether or not the process counter 1 exceeds the number of processes of the part which can be identified by the record i. If exceeding, the flow proceeds to processing 1811, whereas if not exceeding, the flow proceeds to the processing 1804. In the processing 1811, the record counter i of the material difference storage unit 84 is advanced by one, and the flow goes to the comparison processing for the next material. In processing 1812, it is determined whether or not the processing has been completed for all records in the material difference storage unit 84. If completed, the processing in the process comparison unit 85 is terminated. If not completed, the flow proceeds to the processing 1802 and goes to the processing for the next record.

The foregoing embodiment of process comparison has described a method of comparing process attributes such as a process attribute amount on the assumption that a process can be uniquely identified by the process code, after a correspondence has been established by the process code. The correspondence is not limited to the process code but may be made with the process name or another process attribute as long as it is based on a comparison criterion intended by the user.

While this embodiment has been described in the order of the comparison of processes associated with a part and the comparison of processes associated with a material, the order is not necessarily limited to this.

Figure 19:
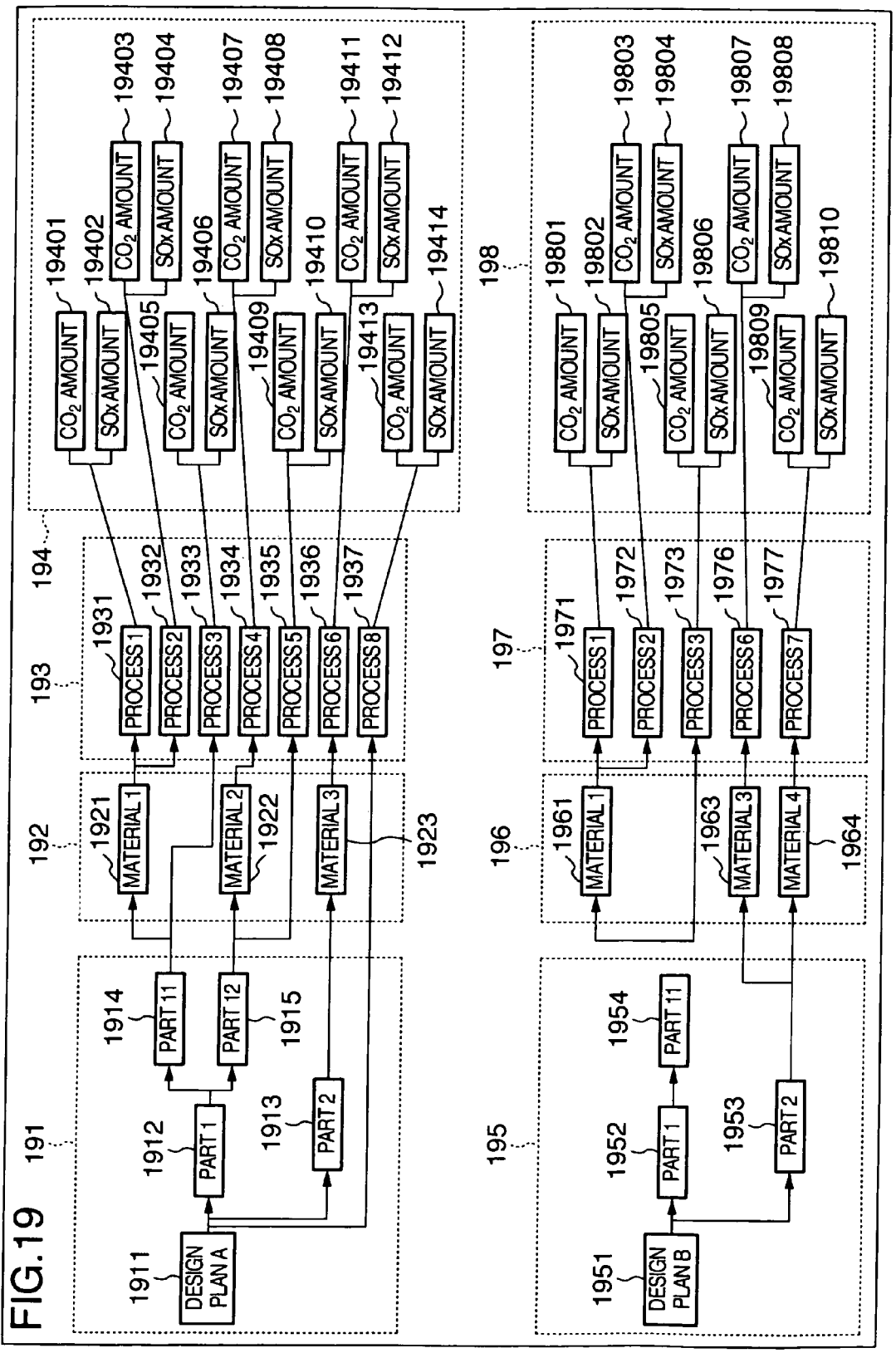
FIG. 19 is a diagram for describing a difference in structure between a design plan A and a design plan B, and a method of comparing values in the result of an evaluation therefor.

Next, a description will be given of the evaluation result comparison unit 7 in FIG. 1. Given as an example is a comparison of the results of evaluations for a design plan A and a design plan B. FIG. 19 illustrates a diagram for describing the difference in structure between the design plan A and the design plan B, and a method of comparing values resulting from the evaluations. Here, components surrounded by a frame 191 represent the parts structure of the design plan A; each element surrounded by a frame 192 indicates a material included in end parts of the design plan A, and each element surrounded by a frame 193 indicates a process from material processing to disposal of each part and material of the design plan A. Also, components surrounded by a frame 195 represent the parts structure of the design plan B, each element surrounded by a frame 194 indicates a material included in end parts of the design plan B, and each element surrounded by a frame 196 indicates a process from material processing to disposal of each part and material of the design plan B. Also, an arrow between respective components represents the parentage between the components. The proximal end of the arrow represents a parent, while the distal end of the same a child.

The parts structure difference storage unit 82 stores the result of a comparison between 191 and 195 in the figure; the material difference storage unit 84 stores the result of a comparison between 192 and 196 in the figure; and the process difference storage unit stores the result of a comparison between 193 and 197 in the figure. The environmental load evaluation result storage unit 2104 in turn stores values in 194 and 198 in FIG. 19.

The evaluation result comparison unit 7 involves processing for finding differences between a design plan and a design plan to be compared for all components (191-193, 195-197 in FIG. 19) from the results of comparisons of the parts structure, materials, and processes, and the result of an evaluation for the environmental load. The evaluation result comparison unit 7 compares processes to be compared to calculates differences therebetween from the result evaluated by the evaluation unit 5, the environmental load value for each of parts x material x process stored in the environmental load evaluation result storage unit 2104, and the correspondence of processes between the design plans to be compared, stored in the process difference storage unit 86.

The evaluation result comparison unit 7 is a unit which compares evaluation values of processes to be compared in each design plan to be compared, finds the magnitude of the value, a difference value and the like, and creates evaluation value data to be displayed. The evaluation result comparison unit 7 is a unit which evaluates the environmental load value by the evaluation unit 5, compares the environmental load values in units of parts x materials x processes between corresponding processes of design plans from the result of providing the environmental load value for each part x material x process as in FIG. 7, and the result of extracting differences of products or design plans by the parts/material/process comparison unit 6. In this processing, the comparison result is stored in the comparison result storage unit 2305. FIG. 20 shows exemplary data items stored in the comparison result storage unit 2305. A process is identified by a design plan 2001, a parts code 2002, a material code 2003, and a process code 2004, and a design plan to be compared is identified by a compared design plan 2005. Subsequently, the presence or absence of an object to be compared 2007, a difference value from an object to be compared 2008, and a ratio of one difference value to another 2009 are stored for an environmental load item which falls under 2006.

Figure 23:
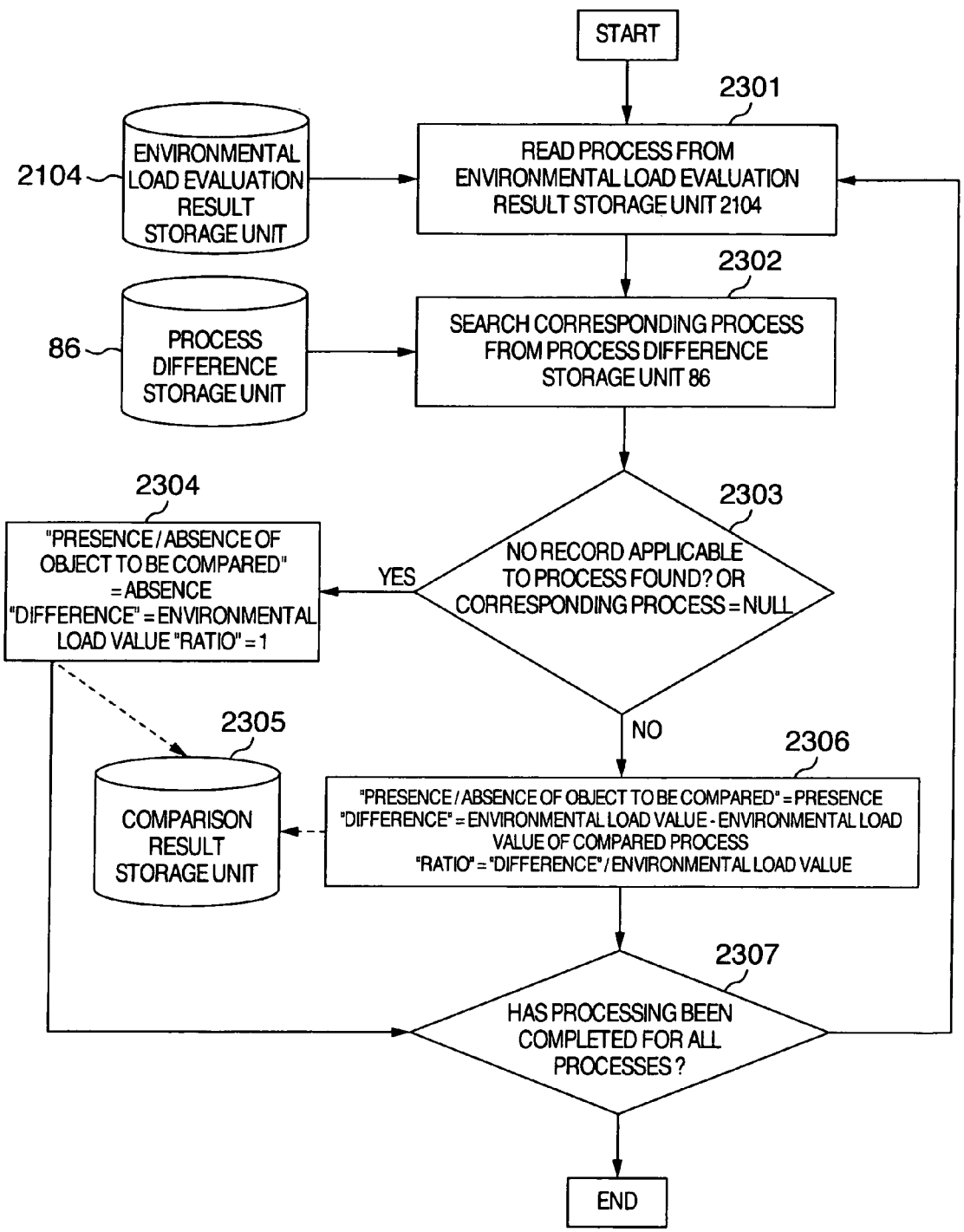
FIG. 23 is a diagram for describing a processing flow of an evaluation result comparison unit.

FIG. 23 illustrates a processing flow of the evaluation result comparison unit 7. In processing 2301, a process is read from the environmental load evaluation result storage unit 2104. Since the environmental load evaluation result storage unit 2107 can uniquely identify a process by items of a design plan 2201, a part 2202, a material 2203, and a process 2204 in a form as shown in FIG. 22, this process is read out.

In processing 2302, a corresponding process is searched from the process difference storage unit 86. The process difference storage unit 86 records in such a form that a process to be compared of a compared design plan corresponding to a basic process which can be identified by 1601-1604 can be identified by 1605-1608, as shown in FIG. 16. Therefore, the present processing is the processing which involves searching for processes which match the process read in the processing 2301 from any of 1601-1604, 1605-1608, and searching for a corresponding process to be compared from matching records. Processing 2303 determines (1) whether or not a record including the process read in the processing 2301 exists in the process difference storage unit 86, or (2) whether or not NULL is contained in a corresponding process though the record including the process does exist. A process which has been determined to be lacking for a corresponding part or a corresponding material for a higher-rank part or material in the processing of the parts/material/process comparison unit 6 is not subjected to the comparison processing, so that no record of a process of the comparison result exists. This falls under the case (1). In these cases (1), (2), it is determined that no corresponding process exists in the design plan to be compared.

In processing 2304, if it is determined in the processing 2303 that there is no corresponding process (row 1613 in FIG. 16), a record is added to the comparison result storage unit 2305, "absence" is entered in the "presence or absence of object to be compared" because there is no object to be compared, the environmental load value is entered in the "difference" as it is because there is no object to be compared, and one is entered in the "ratio." As an example, when a process extracted in the processing 2301 is 2207 in FIG. 22, a record such as a row 2010 in FIG. 20 is added if there is no corresponding process.

In processing 2306, if it is determined in the processing 2303 that there is a corresponding process (row 1616 in FIG. 16), a record is added to the comparison result storage unit 2305, "presence" is entered in the "presence or absence of object to be compared," and a value resulting from a subtraction of an environmental load value of the object to be compared from the environmental load value of the process under processing is entered in the "difference." The value resulting from a division of the value calculated for the "difference" by the environmental load value is entered in the "ratio." Describing with an example, a design plan A, a part 2, a material 3, and a process 6 on a row 1616 of the process difference storage unit 85 (FIG. 16), for example, correspond to the process 6 of the material 3 of the part 2 of the design plan A, and the "difference" of environmental load $CO_2$ is calculated from a column 2209 and a column 2211 in FIG. 22:

$$6670-4580=1090 \qquad (i)$$

and the ratio is calculated by:

$$1090/6670=0.19 \qquad (ii)$$

A record 2010 is added to the comparison result storage unit 2305 (FIG. 20), presence (○) is entered in the "presence or absence of object to be compared"; (i) in the "difference"; and (ii) in the "ratio." In processing 2307, it is determined whether or not the processing has been completed for all processes in the environmental load evaluation result storage unit 2104. If completed, the processing of the evaluation result comparison unit 7 is terminated. If not completed, the flow returns to the processing 2301 to perform the processing for the next process.

The foregoing is the processing flow for the evaluation result comparison of processes in a design plan, and the materials (192, 196) and parts (191, 195) in FIG. 19 are also compared in a similar manner. As is apparent from FIG. 19, the environmental load of a material or part can be found by summing up environmental loads of lower elements of respective components. The environmental load of the material 1 labeled 1921 can be found by summing up the environmental loads of a process 1 labeled 1031 and a process 2 labeled 1932. Similarly, the environmental load of a part 11 labeled 1914 can be found by summing up the environmental load of the material 1 labeled 1921 and the environmental load of a process 3. In this way, the environmental load has been calculated for each of parts and materials which make up a design plan, the part and material are substituted for the process in the processing of FIG. 23, and the processing of FIG. 23 is performed to find a difference in the environmental load for each of the part and material for storage in the comparison result storage unit 2305. When a material is compared, the process difference storage unit 86 is replaced with the material difference storage unit 84. When a part is compared, the process difference storage unit 86 is replaced with the parts structure difference storage unit 82.

The display instruction unit is a unit for creating display contents and instructing the display device 8 from the results of the comparisons of the parts structures, materials, and processes. This unit is a unit for instructing a method of displaying the difference in structure among design plans stored in the parts structure difference storage unit 82, material difference storage unit 84, and process difference storage unit 86, and the difference in evaluation results stored in the comparison result storage unit 2305.

Figure 24:
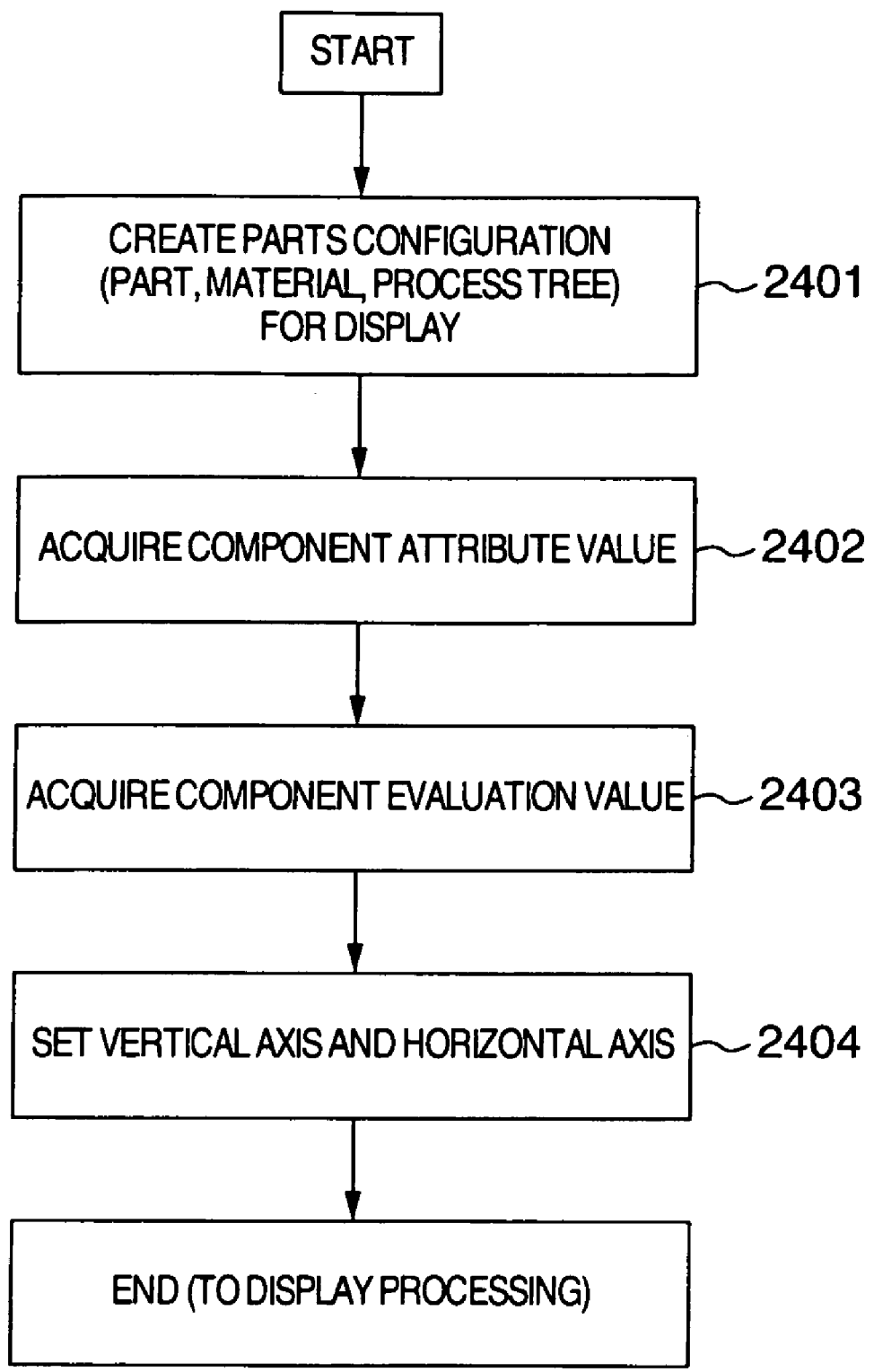
FIG. 24 is a diagram for describing an exemplary method of implementing a display instruction unit.

An exemplary method of implementing the display instruction unit will be described with reference to FIG. 24. In processing 2401, a parts structure is created for display. In this processing, a parts tree is created for displaying results, where a variety of embodiments can be contemplated for the tree herein created. For example, there is a method which shares a part three among design plans and takes a logical OR of components of the design plans to create the parts tree. When this is realized with the example of the design plan A and design plan B in FIG. 19, the tree is created as illustrated in FIG. 25. For example, a part 11 (1914, 1954), a material 1 (1921, 1961), a process 1 (1931, 1971), and the like are components common to the design plan A and design plan B, while a part 12 (1915), a material 2 (1922), a process 4 (1934) and the like, indicated by bold lines, are components associated only with the design plan A. On the other hand, a material 4 (1964), a process 7 (1977) and the like, indicated by broken lines, are components associated only with the design plan B. By displaying such a parts tree, the user is facilitated to more visually extract different portions of the parts structure.

Also, this processing sets to which layer of the parts tree should be displayed. In accordance with the user's need, a variety of cases are contemplated, such as a case where the user does not need the process layer and wishes to display only the parts layer, a case where the user wishes to display up to the material layer, a case where the user wishes to display the parts layer up to a particular layer (the second layer, third layer, or the like), and the like. Such a display of the parts tree is also set here, and a parts tree with set layers is created here. Assume that the user is let arbitrarily select them through a tree display setting unit (not shown) or the like, and they are set in this processing. In processing 2402, attribute values are acquired for each of components (parts, materials, processes) of the parts tree created in the processing 2401. The attributes are acquired for displaying them together with the parts tree when it is displayed, and include a parts mass, a parts mass, a material mass, a process attribute value, and the like. These attribute values are acquired for each of components (parts, materials, processes) and for each design plan. These attributes which affect the environmental load have been compared among design plans, and differences have been recorded in the parts/material/process comparison unit 6, so that the presence or absence of a difference between design plans is also acquired simultaneously. In processing 2403, an environmental load evaluation value is acquired for each of the components (parts, materials, processes) of the parts tree created in the processing 2401. The environmental load evaluation value is acquired for each of the components (parts, materials, processes) and for each of the design plans from the environmental load evaluation result storage unit 2104. Also, a difference in evaluation value between design plans, and a ratio are simultaneously acquired from the comparison result storage unit 2305. In processing 2404, items on the vertical axis and horizontal axis are set for display. In a method contemplated for the display, the environmental loads evaluation values may be arranged in a variety of layouts on the parts tree created in the processing 2401. The environmental load evaluation values are classified according to each of the components (parts, materials, processes) of the parts three, and further classified according to (i) the design plan, (ii) the type of environmental load, (iii) the stage classification, and the like. How to arrange these classifications for display is set here.

For example, in an example shown in FIG. 26, a tree of parts, materials, and processes is displayed in 2601, and the quantity, which is an attribute of each component on the parts tree, is displayed in 2602. Then, the design plans are displayed in 2603, stages in 2604, and stages in 2605, where all of them are set on and arranged along the horizontal axis. In this way, in the example of FIG. 26, the classifications of the environmental load values are all set on and arranged along the horizontal axis for display, but they may be arranged along any of the vertical axis and horizontal axis for display. Since they should be set in accordance with the purpose of comparison, the type of product, the user's preference, and the like, the processing 2404 sets at this stage which classification items are set along which of the vertical axis and horizontal axis, and creates a display format such that the parts tree can be displayed in a form such as FIG. 26. Assume that the user is permitted to arbitrarily select them through an axis setting unit (not shown), and they are set in this processing. It should be noted that all classifications need not be displayed at all times, but selections can be made, such as some of the types of environmental loads may be selected from all items, and the stage classification may not be displayed if not required, and the like.

With the foregoing processing, the contents to be displayed are set, followed by a transition to display processing. The evaluation result display unit 9 is a unit for displaying the evaluation result based on instructions from the display instruction unit 8. In the following, this unit will be described with reference to an example of a displayed screen.

FIG. 27 is an example of a display for comparison, where the number of components in a parts tree, the type of items of stages are simplified for simplicity. 2701 in FIG. 27 designates a parts tree. 2702 designates an attribute item of each component in the parts tree, the number of components in this case. 2703 designates a design plan, and 2704 designates an environmental load item. Based on this display, the value of $CO_2$ can be referenced by a comparison of a column 2706 with 2711, while the value of SOx can be referenced by a comparison of a column 2708 with 2713 between a design plan A and a design plan B. Also, by displaying the difference in the $CO_2$ amount between the design plan A and the design plan B in columns 2707 and 2712, the difference in SOx amount in 2709, 2714, and ratio of the differences and the like, it is possible to explicitly display items which differ in the environmental load value. Also, as shown in 2715 and 2716, when there is a difference in the environmental load value between parts to be compared, the difference of values between objects to be compared can be explicitly displayed by displaying in difference colors, such as a larger value displayed in red, and a smaller value displayed in blue, and the like.

Also, in this exemplary display, the parts structure alone is displayed in the parts tree, without displaying materials or processes. Also, in regard to the setting of the axis, the stages are not classified, and the design plans and environmental load items alone are displayed side by side. In such a display, the user can first identify which environmental load item of which part causes a difference between the design plans. On top of that, the display method can be switched to a more detailed one to specifically confirm which difference in process results in a difference in the environmental load. In the example of FIG. 27, it is apparent that there is a difference in the value of $CO_2$ of the part 11.

Here, by changing or switching the display method to a display which can display up to further detailed levels, it can be specifically confirmed which difference in process results in a difference in the environmental load. The change of the display method can be accomplished by changing layers of the parts tree to be displayed in the creation of the parts structure for display in the processing 2401, or changing items set along the vertical axis and horizontal axis in the processing 2404 by a display method instruction unit.

An example of FIG. 28 is an example in which materials and processes are also displayed on the parts tree 2701 in the example of FIG. 27. As a result, a column 2802 is displayed. Components of the material and process, which are lower-rank attributes of the part 11, are additionally displayed in the column 2802, and associated therewith, an evaluation value for each of the components of the material and process is additionally displayed as shown in 2806. Also, in this exemplary display, an instruction has been made to display the type of stage along the horizontal axis, whereby columns 2804, 2805 are additionally displayed. Also, from the fact that there is a difference in the values of $CO_2$ while there is no difference in the values of SOx in the display of FIG. 27, a displayed environmental load item is only $CO_2$.

By displaying the display of FIG. 27 in greater detail as shown in FIG. 28, it is possible to reference differences in material and process which cause a difference in the environmental load value in greater detail. In this exemplary case, as shown in 2807, 2808, it can be seen that a process of cast iron which is a material that forms part of a part 11 is a transportation by a 10-t truck (2807) in the design plan A, and a transportation by a 20-t truck (2808) in the design plan B. As a result, the $CO_2$ value is "600000" (reference numeral 2809) in the design plan A and "400000" (reference numeral 2810) in the design plan B, from which it is understood that the difference in the material transportation process was the cause for the difference in the $CO_2$ value of the part 11 shown in FIG. 27.

Though not displayed in these examples, information such as the mass of material, the mass of part, and the like may also be displayed as attributes of the part. While the display of the difference and ratio is omitted in the example of FIG. 28, they may also be displayed. While the foregoing has been a simplified example, comparisons can be made in a similar manner even between design plans which have a large number of components, and even if there are a plurality of differences in the parts structure, the cause can be identified in a similar manner. Also, even when three or more design plans are to be compared, the user can recognize differences in the design plans and a difference in the environmental load value by arranging them side by side in a similar manner.

Also, in the structure of FIG. 1, the parts structure editing unit 2, material data editing unit 3, and process data editing unit 4 may be omitted. In this event, this can be realized by editing the part component, material data, and process data, described in the first embodiment, by another unit included in the present invention, and storing an edited BOM in the BOM storage unit 1.

Embodiment 2

Figure 2:
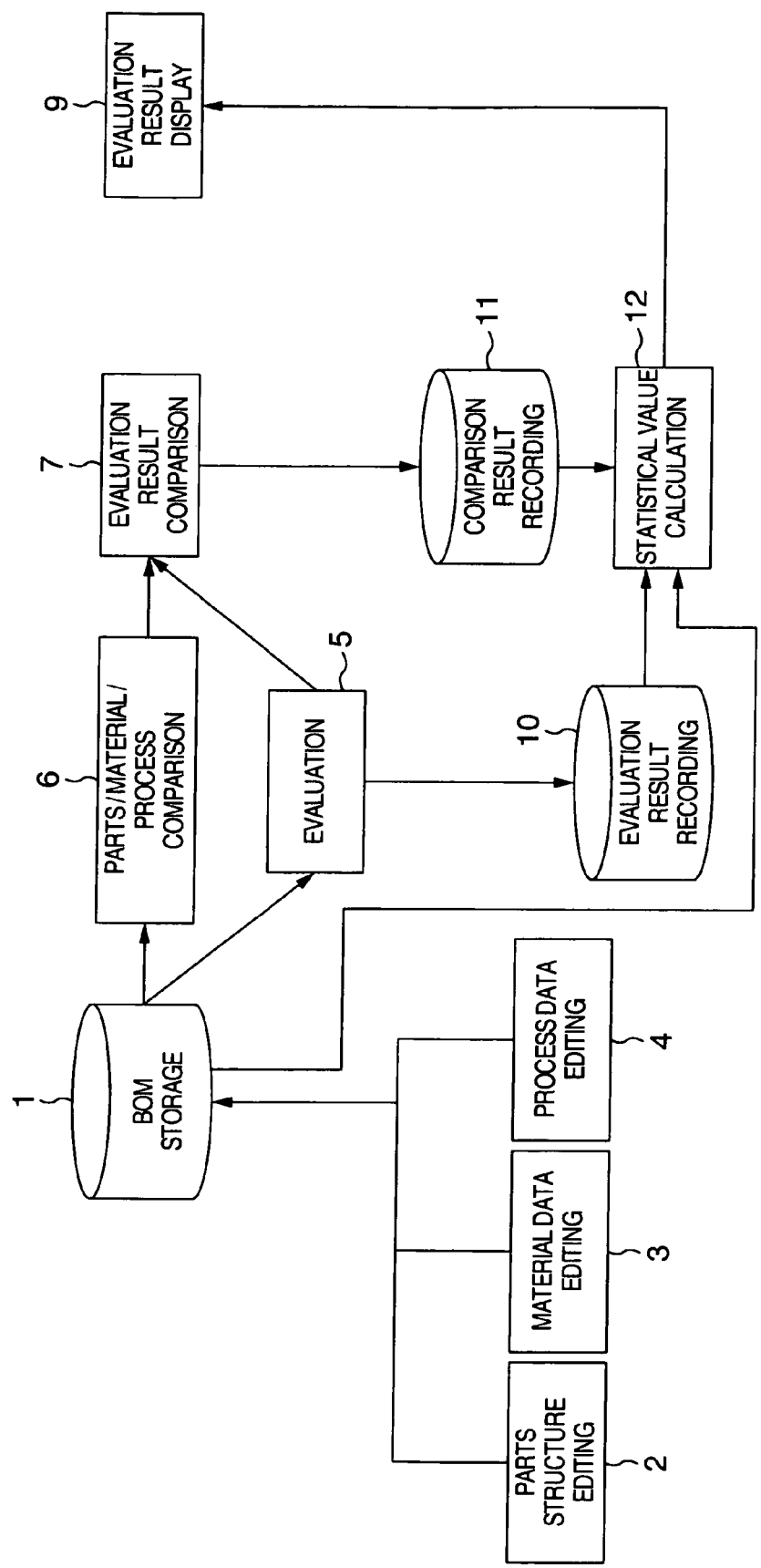
FIG. 2 is a block diagram illustrating the structure of a second embodiment of the evaluation implementation of environmental load according to the present invention.

Next, a description will be given of a second embodiment illustrated in FIG. 2. In comparison with the structure of FIG. 1, newly added are a evaluation result recording unit 10, a comparison result recording unit 11 and a statistical value calculation unit 12.

Realized in this structure is to sequentially record an environmental load value evaluated by the evaluation unit 5, record the result of comparisons made by the evaluation result comparison unit 7 as well, and process them as data to derive an arbitrary statistical value related to the environmental load value.

These new items will be described in order. The evaluation result recording unit 10 is a unit for recording an evaluation load value evaluated by the evaluation unit 5. Since the evaluation unit 5 calculates the environmental load values according to part x material x process of a design plan, as has been previously mentioned, they are recorded, for example, in a format as shown in FIG. 22.

The comparison result recording unit 11 sequentially records results compared by the evaluation result comparison unit 7, for example, in a format as shown in FIG. 20. Products and design plans recorded in the evaluation result recording unit 10 and comparison result recording unit 11 also include design plans which were created in course of trial and error until an actual product is determined but did not commercially introduced into the market. These design plans may be recorded with a flag or the like marked thereto, so that the processing, such as statistical processing can be performed only for those which have been actually commercialized at the time of statistical processing. The statistical value calculation unit 12 is a unit which statistically processes the results of evaluations for environmental loads recorded in the evaluation result recording unit 10 and comparison result recording unit 11, as well as difference values among products to provide statistical information on environmental load values. In this event, when information on the parts structure is required in order to totalize the environmental loads in units of products or the like, the BOM storage unit 1 is referenced. While the environmental load values can be analyzed in units of products even with the foregoing structure, the environmental load values can further be evaluated in units of factories, sites, enterprises and the like if such data as a track record for the number of produced products per year on a product-by-product basis can be available. For example, when data is available form a production management system, this data can be used to evaluate the environmental load value. The production management system herein referred to is a system for managing production plans and execution, so that the production management system records details of information on how many of which product was produced in which period. An actual production situation is acquired from this system to calculate an environmental load value for one product, thereby making it possible to evaluate the environmental load value based on an actually produced number of a certain product, to calculate an annual environmental load value in units of factories, and to calculate the environmental load value in units of enterprises as well.

Figure 29:
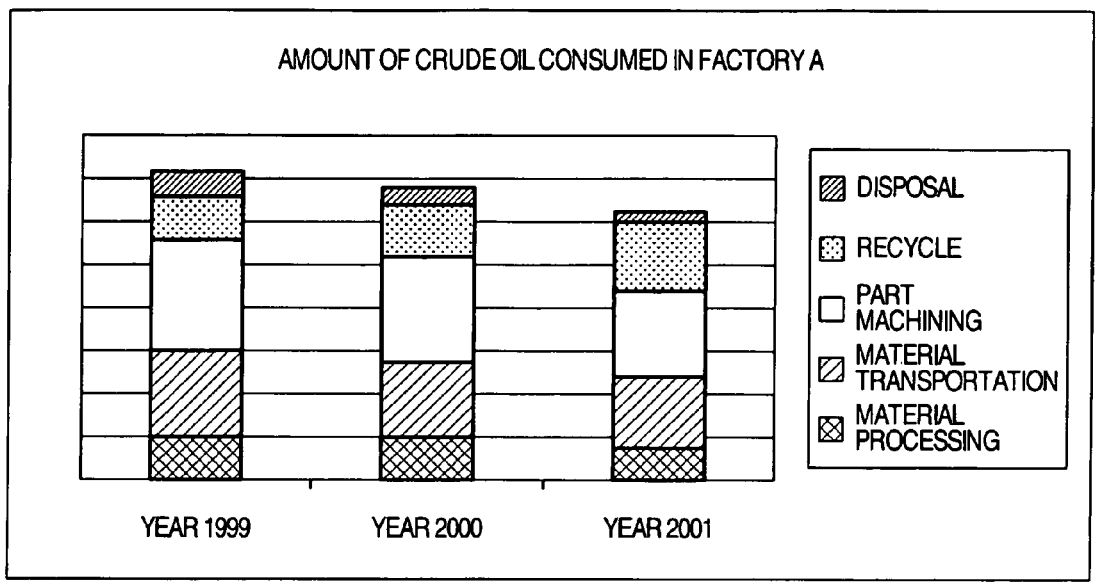
FIG. 29 is a diagram illustrating a first example of visualized statistical values using a graph in an evaluation result display unit 9.

The evaluation result display unit 9 visualizes statistical values statistically processed by the statistical value calculation unit by such devices as a table, a graph and the like. FIG. 29 is an example of visualizing statistical values using a graph by the evaluation result display unit 9. For example, for finding a change in the amount of consumed crude oil in a factory as does in this example, the statistical value calculation unit 12 processes in the following manner.

(1) Environmental load value data evaluated for crude oil of products manufactured in a factory A for each year (year 1999, year 2000, year 2001) is extracted from evaluation result recording unit 10.

(2) The number of products produced in the factory A for each year is acquired, for example, from a production management system or the like.

(3) The data extracted in (1) and the data acquired in (2) are accumulated for each product.

(4) The values calculated in (3) are summed up for each stage (in the case of this example, processing of material, material transportation, machining of parts, recycle, and disposal).

The values found by the foregoing processing are represented in a graphical form by the evaluation result display unit 9 for display as shown in FIG. 29. A change in the amount of crude oil consumed in the factory A is visualized on a year-by-year basis for each stage.

Figure 30:
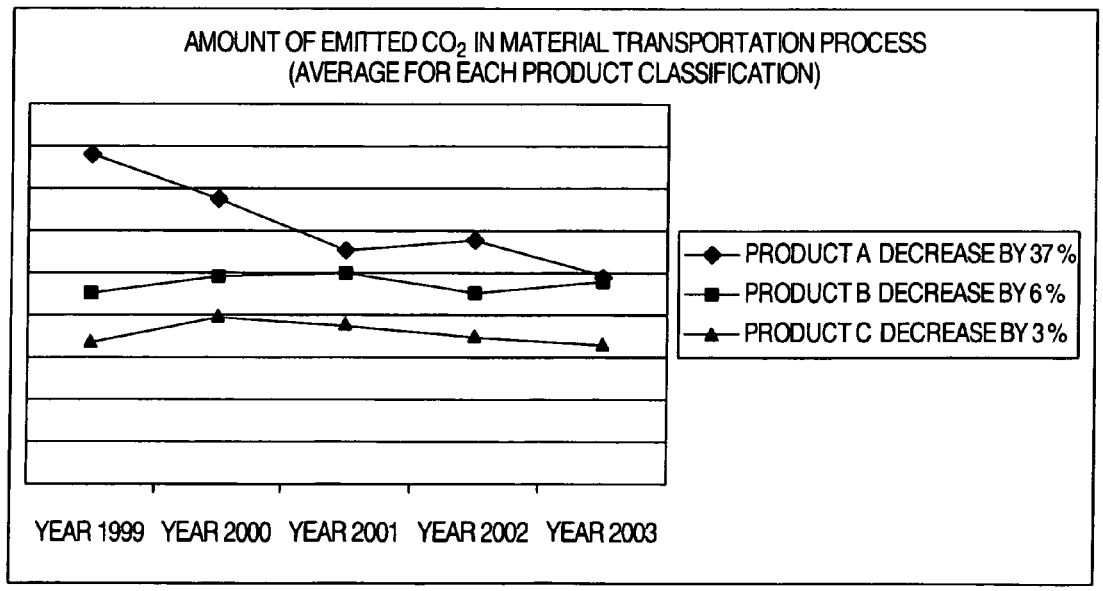
FIG. 30 is a diagram illustrating a second example of visualized statistical values using a graph in the evaluation result display unit 9.

FIG. 30 is another example of visualizing statistical values using a graph by the evaluation result display unit 9. For finding the amount of emitted $CO_2$ in an average material transportation process per product classification, as does in this example, the statistical value calculation unit 12 processes in the following manner.

(1) Data associated with the transportation of materials is extracted from the evaluation result recording unit 10 among environmental load value data, evaluated for $CO_2$ of products produced in each year (year 1999, year 2000, year 2001, year 2002, year 2003).

(2) The data extracted in (1) are totalized in units of products.

(3) The values totalized in (2) are averaged on a year-by-year basis for each product classification.

(4) A difference between the first year (year 1999) and the last year (year 2003) is calculated for each product classification, and the ratio of the difference to the first year is calculated to calculate an rate of change.

Values calculated by the foregoing processing are represented in a graphical form by the evaluation result display unit 9 to display as shown in FIG. 30. The average value of emitted $CO_2$ amount, and the rate of change in the material transportation process are visualized on a year-by-year basis for each year.

In this way, since the evaluation result recording unit 10 stores the environmental load value for each of parts, materials, and processes, it is possible to calculate a statistical value for a specified process. In the case of the example of FIG. 30, when the material transportation distance is reduced by changing the supplier of a material or the like, for example, for a certain product A to accomplish an improvement in a reduction of the amount of $CO_2$ associated with the transportation, it is possible to confirm to which degree the effect of improvement has been achieved with values in a specific manner. Like this example, the effect of improvement in units of parts, materials, and processes, for which efforts were made for improvement, can be effectively provided in the form of statistical values.

While the foregoing has been a description of the second embodiment, this embodiment is characterized by the ability to provide statistical values for a plurality of products and design plans, all products designed in units of years, and design plans, not limited to a single product or design plan, in units of parts, in units of materials, and in unit of processes because the information which evaluates the environmental load values of products and design plans are recorded in units of parts x materials x processes. Also, by tracing a change in an environmental load up to the designing of a product, it is possible to trace the history of efforts toward improvements in a design section.

Embodiment 3

Next, a third embodiment will be described with reference to FIG. 3. A new structure, as compared with the first embodiment and second embodiments, includes an external criterion storage unit 13, an evaluation result comparison unit 14, and a display method instruction unit 15. Realized by this structure is to compare environmental load evaluation results with a criterion of an arbitrary viewpoint such as the industrial level, the level of the top enterprise in the industry, or the like.

The new structure in the third embodiment will be described in order. The external criterion storage unit 13 can store any external criterion relating to the environmental load. For example, there may be (1) one which involves calculations of values over a whole enterprise such as a "reduction in the amount of crude oil consumed per year by 15%" or the like, or (2) a criterion which is presented in absolute value rather than the proportion of reduction, with a specified process, such as a "reduction in the amount of emitted $CO_2$ in manufacturing processes by 10 tons per year" or the like.

The evaluation result comparison unit 14 is a unit which extracts data for comparison with an external criterion stored in the external criterion storage unit 13 from the evaluation result recording unit 10, and performs statistical calculations if necessary to create an environmental load value for comparison with the external criterion stored in the external criterion storage unit 13.

For example, when the external criterion defines (1) "reduction in the amount of crude oil consumed per year by 15%," evaluation results for the crude oil for all products produced in a basic year and the preceding year are extracted from the evaluation result recording unit 10, and are integrated with data on the number of produced products in both years to find the amount of total crude oil consumption in each year, and a reduction proportion is calculated to permit a comparison with the external criterion (1). In this calculation, when data on the number of produced products can be provided from a production management system, this can be used.

On the other hand, when the external criterion is (2) "reduction in the mount of emitted $CO_2$ in manufacturing processes by 10 tons per year," only data relating to the amount of emitted $CO_2$ in processes pertinent to the manufacturing process is extracted from among all products produced in a basic year and the preceding year, and integrated with data on the number of produced products in both years to find the total amounts of emitted $CO_2$ in the basic and preceding years, the latter of which is subtracted from the former to take a difference which can be then compared with the external criterion (2). Likewise, in this calculation, when data on the number of produced products can be provided from a production management system, this can be used.

In the foregoing manner, in the third embodiment, comparisons with a variety of external criteria can be made as well by using the environmental load evaluation results which have been calculated and recorded for products and design plans without the need for additionally collecting data. Also, the third embodiment is characterized in that, because of the environmental load values being recorded in units of parts x materials x processes, the environmental load value can be calculated as required in arbitrary required units, and compared with any external criterion. Also, it is contemplated, from a view point of consideration for the environment, that a variety of environmental regulations come into operation in regard to the environmental load amount, or the level must be compared with other companies in the feature. The external criterion in such a case is not necessarily a criterion in units of products, and a comparison with an external criterion will be required for each particular material and process or for each particular process such as a reduction in the amount of environmental load in a particular process associated with a particular material (for example, the amount of environmental load involved in the disposal of PP, and the like), or setting of an upper limit value for the environmental load value for a particular process (transportation or the like), and the like. According to the embodiment described above, since the environmental load value is evaluated and held for each of process, part or material, the environmental load value can be readily compared with an arbitrary external criterion for each corresponding part, material, and process. In addition, the result of the comparison can be fed back to the design so as not to exceed the external criterion.

Embodiment 4

Figure 31:
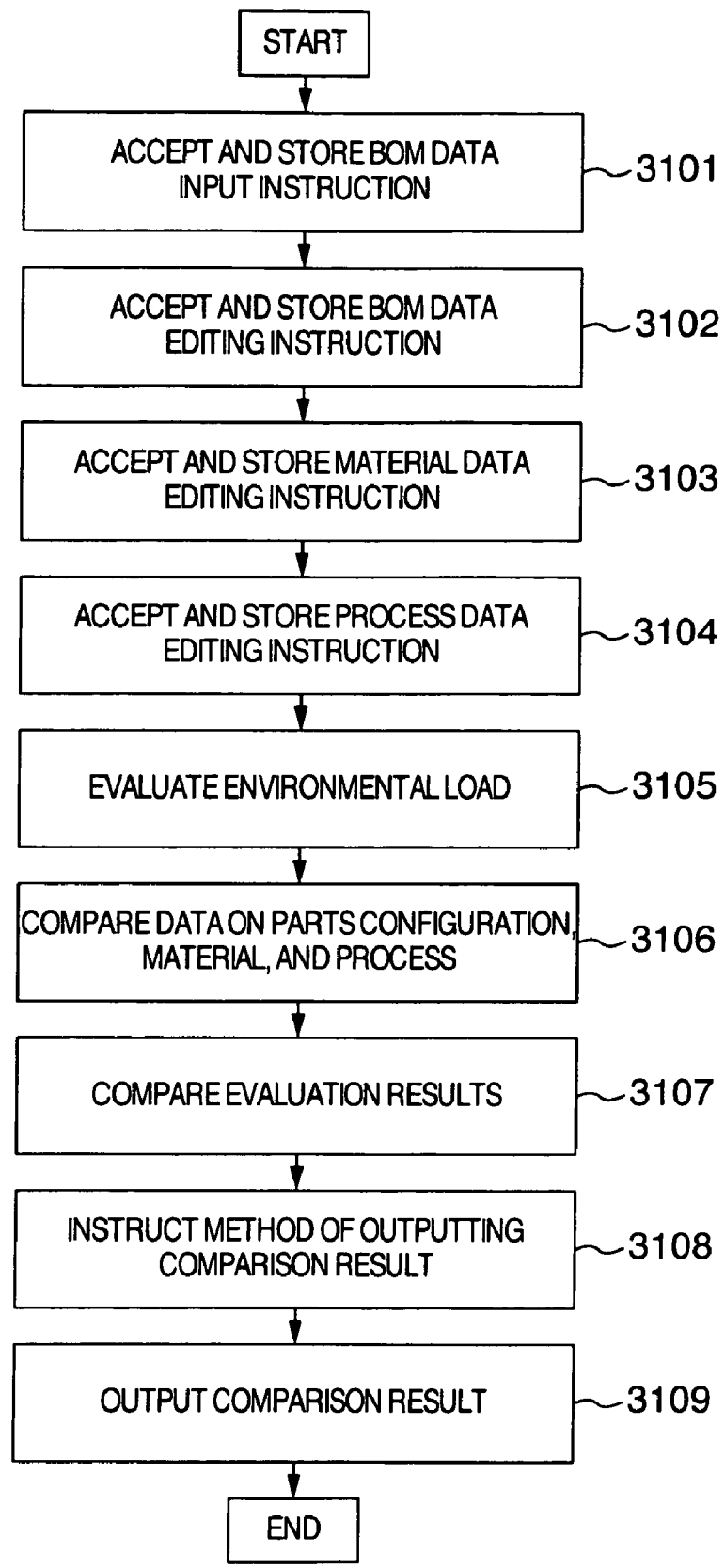
FIG. 31 is a diagram illustrating a processing flow in a first embodiment of an evaluation method of environmental load according to the present invention.

Next, a first embodiment of an environmental load evaluation method according to the present invention will be described with reference to FIG. 31. The first embodiment of the environmental load evaluation method is as follows when the evaluation implementation of environmental load in FIG.

1 is used to perform the processing. In processing 3101, an instruction of entering BOM data in the BOM storage unit 1 is accepted and stored. In processing 3102, a BOM data editing instruction is accepted from the parts structure editing unit 2, and stored in the BOM storage unit 1. In processing 3103, a material data editing instruction is accepted from the material data editing unit 3, and stored in the BOM storage unit 1. In processing 3104, a process data editing instruction is accepted from the process data editing unit 4, and stored in the BOM storage unit 1. In processing 3105, an environmental load is evaluated by the evaluation unit 5. In processing 3106, data on parts structures, materials, and processes are compared by the parts/material/process comparison unit 6. In processing 3107, the evaluation results are compared by the evaluation result comparison unit 7. In processing 3108, a comparison result outputting method is instructed by the display instruction unit 8. In processing 3109, the comparison results are outputted by the evaluation result display unit 9. The foregoing is the flow of processing in the first embodiment of the environmental load evaluation method. It should be noted that details of each processing can be realized in accordance with the detailed description of the evaluation implementation of environmental load in FIG. 1.

Embodiment 5

Figure 32:
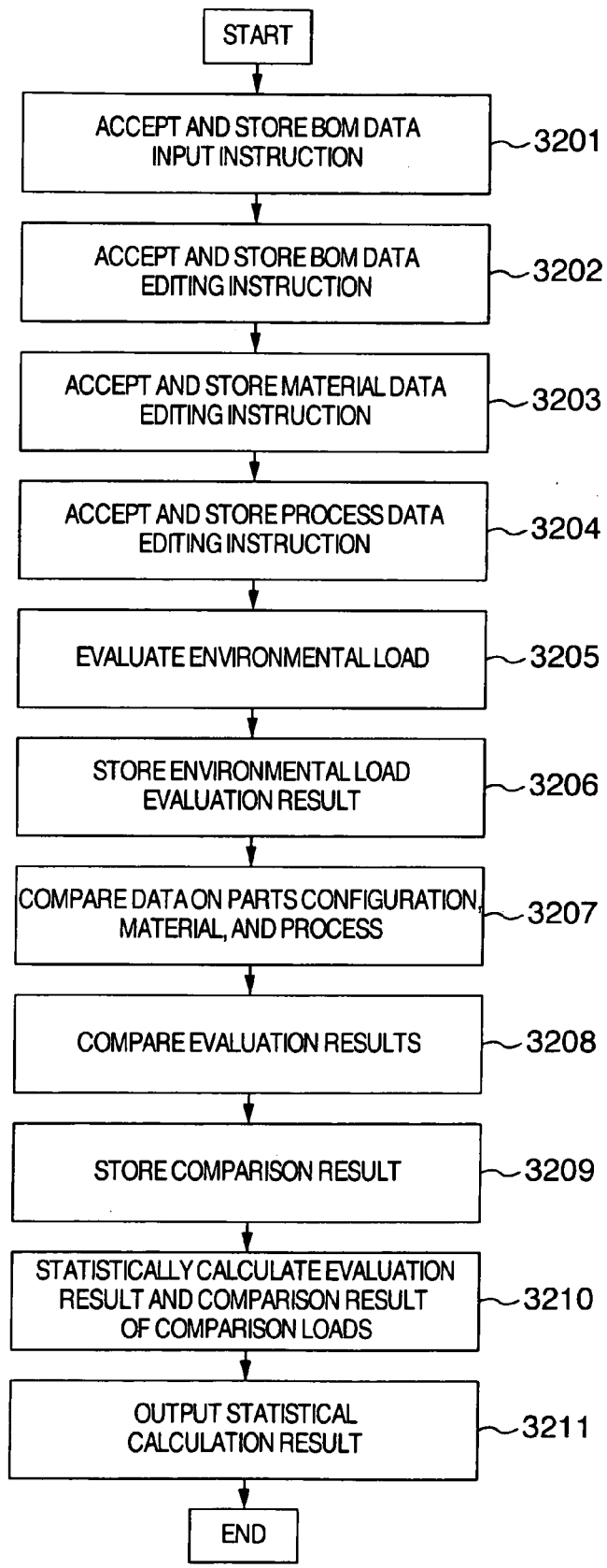
FIG. 32 is a diagram illustrating a processing flow in a second embodiment of the evaluation method of environmental load according to the present invention.

Next, a second embodiment of the environmental load evaluation method will be described with reference to FIG. 32. The second embodiment of the environmental load evaluation method is as follows when the evaluation implementation of environmental load in FIG. 2 is used to perform the processing. In processing 3201, an instruction of entering BOM data in the BOM storage unit 1 is accepted and held. In processing 3202, a BOM data editing instruction is accepted from the parts structure editing unit 2, and stored in the BOM storage unit 1. In processing 3203, a material data editing instruction is accepted from the material data editing unit 3, and stored in the BOM storage unit 1. In processing 3204, a process data editing processing is accepted from the process data editing unit 4, and stored in the BOM storage unit 1. In processing 3205, an environmental load is evaluated by the evaluation unit 5. In processing 3206, the environmental load evaluation result is stored in the evaluation result recording unit 10. In processing 3207, data on the parts structures, materials, and processes are compared by the parts/material/process comparison unit 6. In processing 3208, the evaluation results are compared by the evaluation result comparison unit 7. In processing 3209, the comparison results are stored by the comparison result recording unit 11. In processing 3210, the evaluation results and comparison results of the environmental loads are statistically processed by the statistical value calculation unit 12. In processing 3211, the statistical processing result is outputted by the evaluation result display unit 9. The foregoing is the flow of the processing in the second embodiment of the environmental load evaluation method. It should be noted that details of each processing can be realized in accordance with the detailed description of the evaluation implementation of environmental load in FIG. 2.

Embodiment 6

Figure 33:
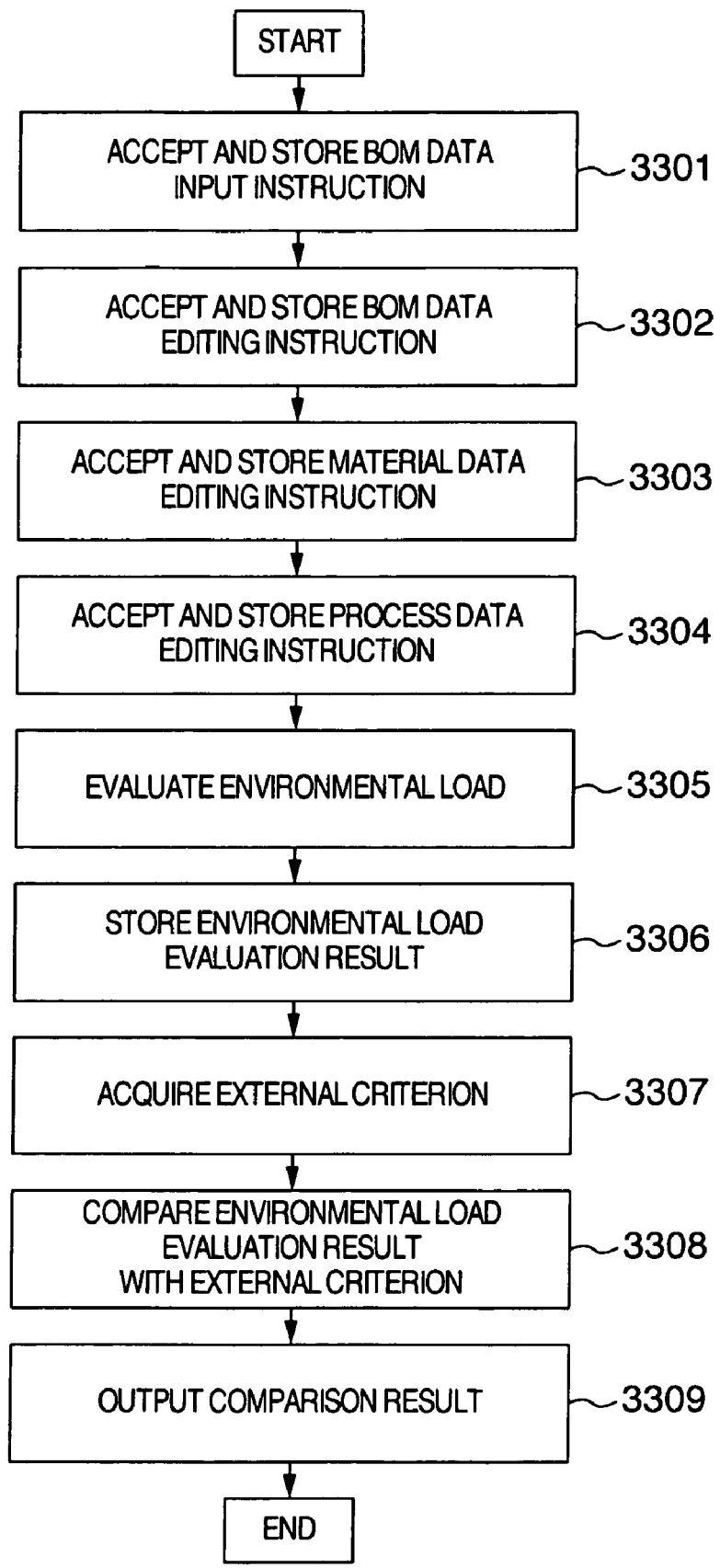
FIG. 33 is a diagram illustrating a processing flow in a third embodiment of the evaluation method of environmental load according to the present invention.

Next, a third embodiment of the environmental load evaluation method according to the present invention will be described with reference to FIG. 33. The third embodiment of the environmental load evaluation method is as follows when the evaluation implementation of environmental load in FIG. 3 is used to perform the processing. In processing 3301, an instruction of entering BOM data in the BOM storage unit 1 is accepted and held. In processing 3302, a BOM data editing instruction is accepted from the parts structure editing unit 2, and stored in the BOM storage unit 1. In processing 3303, a material data editing instruction is accepted from the material data editing unit 3, and stored in the BOM storage unit 1. In processing 3304, a process data editing processing is accepted from the process data editing unit 4, and stored in the BOM storage unit 1. In processing 3305, an environmental load is evaluated by the evaluation unit 5. In processing 3306, the environmental load evaluation result is stored in the evaluation result recording unit 10. In processing 3307, an external criterion is acquired. In processing 3308, the external criterion is compared with the environmental load evaluation result by the evaluation result comparison unit 14. In processing 3309, the comparison result is outputted by the evaluation result display unit 9. The foregoing is the flow of processing in the third embodiment of the environmental load evaluation method. It should be noted that details of each processing can be realized in accordance with the detailed description of the evaluation implementation of environmental load in FIG. 3. While the environmental load amount has been used as an evaluation value in the foregoing embodiments, similar effects can be provided as well when the value of impact representative the degree of influence on seven categories of resource depletion, air pollution, global warming, acid rain, ozone depletion, water pollution, and human toxicity, calculated by multiplying the environmental load item by a coefficient, is used as the evaluation value.

Structures of the present invention which can be contemplated other than the embodiments described above are enumerated in the following.

(1) An evaluation implementation of environmental load which comprises BOM storing means for storing information on a parts structure, a material, and a process of one or a plurality of products or design plans; environmental load evaluating means for evaluating an environmental load based on the parts structure, material, and process included in data of an arbitrary BOM from those stored in the BOM storing means; parts structure/material/process comparing means for comparing the parts structures, materials, and processes of two or more arbitrary BOMs from a plurality of BOMs stored in the BOM storing means to extract differences; evaluation result comparing means for comparing environmental load amounts of a plurality of BOMs based on the differences extracted by the parts structure/material/process comparing means, and the environmental load amounts evaluated by the evaluation means for the plurality of BOMs to extract differences between the evaluation values; display instructing means for instructing a display method for comparing and displaying differences in structure among the plurality of BOMs, and the differences in the evaluation values from the differences in the evaluation values extracted by the evaluation result comparing means, and the difference in structure extracted by the parts structure/material/process comparing means; and evaluation result display means for displaying the evaluation result for the environmental load based on an instruction of the display instructing means.

(2) The evaluation implementation of environmental load as set forth in (1), which further comprises parts structure editing means for changing the parts structure stored in the BOM storing means, material data editing means for changing material data in a similar manner, and process data editing means for changing process data in a similar manner.

(3) The evaluation implementation of environmental load as set forth in (1), (2), wherein the evaluation result comparing means calculates a difference and a ratio between evaluation values to be compared.

(4) The evaluation implementation of environmental load as set forth in (3), characterized in that the display instructing means instructs to display the difference and ratio between the evaluation values to be compared.

(5) The evaluation implementation of environmental load as set forth in (1)-(4), wherein the parts structure/material/process comparing means also compares differences of attributes which affect the evaluation results for the environmental loads of the quantity and mass of the parts, the mass of the material, and the like.

(6) The evaluation implementation of environmental load as set forth in (5), characterized in that the display instructing means instructs to additionally display the difference of the attributes which affect the evaluation results for the environmental loads of the quantity and mass of the parts, the mass of the material, and the like.

(7) The evaluation implementation of environmental load as set forth in (1)-(6), wherein the display instructing means instructs to display different portions of the parts structure, material, and process, and different portions of the evaluation values in different colors.

(8) An evaluation implementation of environmental load which comprises BOM storing means for storing information on a parts structure, material, and process of one or a plurality of products or design plans; evaluating means for evaluating an environmental load based on the parts structure, material, and process included in data of an arbitrary BOM from those stored in the BOM storing means; evaluation result recording means for storing the result evaluated by the evaluating means; statistical value processing means for performing statistical operations based on the evaluation results recorded in the evaluation result recording means, such as calculations of the sum, average value and the like of the environmental load amount per unit period of a product, and calculations of the values of an increasing/decreasing amount, a rate of change, and the like; and evaluation result display means for displaying the processed statistical values.

(9) An evaluation implementation of environmental load which comprises BOM storing means for storing information on a parts structure, material, and process of one or a plurality of products or design plans; parts structure editing means for changing the parts structure in a BOM stored in the BOM storing means; material data editing means for changing material data in a similar manner; process data editing means for changing process data in a similar manner; environmental load evaluating means for evaluating an environmental load based on the parts structure, material, and process included in data of an arbitrary BOM from those stored in the BOM storing means; parts structure/material/process comparing means for comparing the parts structures, materials, and processes of two or more arbitrary BOMs from a plurality of BOMs stored in the BOM storing means to extract differences; evaluation result comparing means for comparing environmental load amounts of a plurality of BOMs based on the differences extracted by the parts structure/material/process comparing means, and the environmental load amounts evaluated by the evaluation means for the plurality of BOMs to extract differences between the evaluation values; evaluation result recording means for storing the result evaluated by the evaluating means; comparison result recording means for recording the comparison result compared by the evaluation result comparing means; statistical value processing means for performing statistical operations based on the evaluation results recorded in the evaluation result recording means, such as calculations of the sum, average value and the like of the environmental load amount per unit period of a product, and calculations of the values of an increasing/decreasing amount, a rate of change, and the like; and evaluation result display means for displaying the processed statistical values.

(10) The evaluation implementation of environmental load as set forth in (8), (9), which further comprises parts structure editing means for changing the parts structure stored in the BOM storing means, material data editing means for changing material data in a similar manner, and process data editing means for changing process data in a similar manner.

(11) The evaluation implementation of environmental load as set forth in (8)-(10), characterized in that data provided from a production management system is used as production track record data for use by the statistical value processing means.

(12) An evaluation implementation of environmental load which comprises BOM storing means for storing information on a parts structure, material, and process of one or a plurality of products or design plans; evaluating means for evaluating an environmental load based on the parts structure, material, and process included in data of an arbitrary BOM from those stored in the BOM storing means; evaluation result recording means for storing the result evaluated by the evaluating means; external criterion storing means for storing an external criterion for comparison with the evaluation result of the environmental load; evaluation result comparing means for extracting information required for a comparison with the external criterion stored in the external criterion storing means from the evaluation result recording means, and creating environmental load information for comparison with the external criterion before the comparison is made; and evaluation result display means for displaying the result of the comparison of the environmental load value with the external criterion.

(13) The evaluation implementation of environmental load as set forth in (12), which further comprises parts structure editing means for changing the parts structure stored in the BOM storing means, material data editing means for changing material data in a similar manner, and process data editing means for changing process data in a similar manner.

(14) The evaluation implementation of environmental load as set forth in (12), (13), wherein data provided from a production management system is used as production track record data for use by the statistical value processing means.

(15) An evaluation implementation of environmental load which comprises BOM storing means for storing information on a parts structure, material, and process of one or a plurality of products or design plans; parts structure editing means for changing the parts structure in a BOM stored in the BOM storing means; material data editing means for changing material data in a similar manner; process data editing means for changing process data in a similar manner; environmental load evaluating means for evaluating an environmental load based on the parts structure, material, and process included in data of an arbitrary BOM from those stored in the BOM storing means; parts structure/material/process comparing means for comparing the parts structures, materials, and processes of two or more arbitrary BOMs from a plurality of BOMs stored in the BOM storing means to extract differences; evaluation result comparing means for comparing environmental load amounts of a plurality of BOMs based on the differences extracted by the parts structure/material/process comparing means, and the environmental load amounts evaluated by the evaluation means for the plurality of BOMs to extract a difference between the evaluation values; display instructing means for instructing a display method for comparing and displaying differences in structure among the plurality of BOMs, and the differences in the evaluation values from the differences in the evaluation values extracted by the evaluation result comparing means, and the difference in structure extracted by the parts structure/material/process comparing means; evaluation result display means for displaying the evaluation result for the environmental load based on an instruction of the display instructing means; evaluation result recording means for storing the result evaluated by the evaluating means; comparison result recording means for recording the comparison results compared by the evaluation result comparing means; statistical value processing means for statistically processing the values of the environmental loads for products based on the evaluation result recorded in the evaluation result recording means and the comparison result recorded in the comparison result recording means; external criterion storing means for storing an external criterion for comparison with the evaluation result of the environmental load; and evaluation result comparing means for extracting information required for a comparison with the external criterion stored in the external criterion storing means from the evaluation result recording means, and creating environmental load information for comparison with the external criterion before the comparison is made.

(16) The evaluation implementation of environmental load as set forth in (1)-(15), wherein the BOM is represented by a layer of parts, a layer of materials associated with the parts, and a layer of processes associated with the parts or materials as a data structure for the BOM stored in the BOM storing means.

(17) An environmental load evaluating method has the steps of accepting and storing a BOM data input instruction; accepting and storing a BOM data editing instruction; accepting and storing a material data editing instruction; accepting and storing a process data editing instruction; evaluating an environmental load; comparing data on a parts structure, material, and process; comparing evaluation results; instructing a method of outputting the comparison result; and outputting the comparison result.

(18) An environmental load evaluating method has the steps of accepting and storing a BOM data input instruction; accepting and storing a BOM data editing instruction; accepting and storing a material data editing instruction; accepting and storing a process data editing instruction; evaluating an environmental load; storing the result of the environmental load evaluation; comparing data on parts structure, material, and process; comparing evaluation results; storing the comparison results; statistically processing the evaluation result of the environmental load, and the comparison result; and outputting the result of the statistical processing.

(19) An environmental load evaluating method has the steps of accepting and storing a BOM data input instruction; accepting and storing a BOM data editing instruction; accepting and storing a material data editing instruction; accepting and storing a process data editing instruction; evaluating an environmental load; storing the result of the environmental load evaluation; acquiring an external criterion; comparing the external criterion with the environmental load evaluation result; and outputting the comparison result.

Also, the processing described in the aforementioned embodiments may be a program executed by a computer.

While the foregoing description has been made on embodiments, it is apparent to those skilled in the art that the present invention is not so limited, but a variety of alterations and modifications can be made within the spirit of the present invention and the appended claims.

The invention claimed is:

1. An evaluation apparatus of environmental load comprising:
BOM (bill of materials) storage means for storing information on parts structures, materials, and processes of a plurality of product design plans;
evaluation means for calculating environmental load evaluation values for the product design plans using the parts structures, materials, and processes of the plurality of product design plans stored in said BOM storage means;
evaluation result comparison means for calculating a difference between the environmental load evaluation values for the plurality of product design plans calculated by said evaluation means;
parts/material/process comparison means for calculating a difference in the parts structure, material, or process between a plurality of product design plans stored in said BOM storage means; and
display means for a parts tree of the parts structures for a user thereby to acquire selection of a part of the parts tree to be displayed and selection of vertical and horizontal axes as layouts of the part of the parts tree and displaying the difference between the environmental value evaluation values for the part of the parts tree calculated by said evaluation result comparison means, wherein said evaluation result display means displays the difference in the parts structure, material, or process between the plurality of product design plans for products calculated by said parts/material/process comparison means according to the selection of the vertical and horizontal axes as layouts.

2. An evaluation apparatus of environmental load according to claim 1, wherein said environmental load evaluation value is the amount of emitted $CO_2$ or the amount of emitted SOx relating to the product design plan.

3. An evaluation apparatus of environmental load according to claim 1, wherein said process information is information relating to a manufacturing method, a transportation method, or a using method.

4. An evaluation apparatus of environmental load according to claim 1, wherein said evaluation result display means displays the difference in the parts structure, material, or process between the plurality of product design plans extracted by said BOM storage means, and the difference in the environmental load evaluation value calculated by said evaluation means.

5. An evaluation apparatus of environmental load according to claim 1, wherein when the plurality of product design plans differ in the parts structure, material, and process, said display means highlights the parts structure, material and process of the different product design plan.

6. An evaluation apparatus of environmental load according to claim 1, further comprising unit period environmental load amount calculating means for calculating a total amount or an average value of the environmental load per unit period of a product of a design plan using an environmental load value of the product design plan calculated by said environmental load evaluation value calculating means.

7. An evaluation apparatus of environmental load according to claim 6, wherein said unit period evaluation means calculates the total amount or the average value of the environmental load per unit period of the product design plan using production track record information derived from a production management system.

8. An evaluation apparatus of environmental load according to claim 1, further comprising design plan information changing means for changing the information on the parts structure, material, or process of the product design, wherein said BOM storage means stores the information on the parts structure, material, or process of the product design plan after the information has been changed, said evaluation means calculates the environmental load value for the design plan after the design plan has been changed by said design plan information changing means using the information on the parts structure, material, or process of the product design plan stored in said BOM storage means after the information has been changed, and said evaluation implement of environmental load comprises evaluation result comparison means for calculating a difference between the environmental load evaluation value for the design plan calculated by said evaluation means and stored in said BOM storage means and the environmental load evaluation value for the design plan after the design plan has been changed by said design plan information changing means, and evaluation result display means for displaying the difference between the environmental load values calculated by said evaluation result comparison means.

9. An evaluation apparatus of environmental load according to claim 1, wherein said evaluation result comparison means calculates a ratio of the environmental load values for the plurality of product design plans calculated by said evaluation means.

10. An evaluation apparatus of environmental load according to claim 1, wherein said parts/material/process comparison means calculates a difference in the quantity of parts in the plurality of product design plans or an attribute of the parts.

11. An evaluation apparatus of environmental load, comprising BOM (bill of materials) storage means for storing information on a parts structure of a product design plan or materials of parts which make up the parts structure and processes of the parts which make up the parts structure;

evaluation means for calculating an environmental load evaluation value for the product design plan using the information on the parts structure of the product design plan or the materials of the parts which make up the parts structure and the processes of the parts which make up the parts structure stored by said BOM storage means;

parts/material/process comparison means for calculating a difference in the parts structure, material, or process between a plurality of product design plans stored in said BOM storage means; and display means for displaying a parts tree of the parts structures for a user thereby to acquire selection of a part of the parts tree to be displayed and selection of vertical and horizontal axes as layouts of the part of the parts tree and displaying the difference between the environmental value evaluation values for the part of the parts tree calculated by said evaluation result comparison means, wherein said display means displays the difference in the parts structure, material, or process between the plurality of product design plans for products calculated by said parts/material/process comparison means.

12. An evaluation apparatus of environmental load according to claim 11, further comprising environmental load statistical value calculating means for calculating a total value, an average value, an increasing/decreasing amount, or a rate of change of an environmental load amount per unit period of a product using the environmental load value for the design plan calculated by said evaluation means according to the selection of the vertical and horizontal axes as layouts.

13. An evaluation apparatus of environmental load according to claim 11, further comprising external criterion storing means for storing an external criterion for an environmental load value, and evaluation result comparison means for calculating the result of comparing the external criterion stored by said external criterion storing means with the environmental load evaluation value for the product design plan calculated by said evaluation means.

14. A storage medium storing therein an evaluation program of environmental load causing a computer, when loaded therein with the program, to function as BOM (bill of materials) storage means for storing information on parts structures, materials, and processes of a plurality of product design plans; evaluation means for calculating environmental load evaluation values for the product design plans using the parts structures, materials, and processes of the plurality of product design plans stored in said BOM storage means; evaluation result comparison means for calculating a difference between the environmental load evaluation values for the plurality of product design plans using the parts structures, materials, and processes of the product design plans stored in said BOM storage means; parts/material/process comparison means for calculating a difference in the parts structure, material, or process between a plurality of product design plans stored in said BOM storage means; and display means for displaying a parts tree of the parts structures for a user thereby to acquire selection of a part of the parts tree to be displayed and selection of vertical and horizontal axes as layouts of the part of the parts tree and displaying the difference between the environmental value evaluation values for the part of the parts tree calculated by said design plan information comparing means, wherein said evaluation result display means displays the difference in the parts structure, material, or process between the plurality of product design plans for products calculated by said design plan information comparing means according to the selection of the vertical and horizontal axes as layouts.

* * * * *